(12) United States Patent
Turgman et al.

(10) Patent No.: US 11,514,457 B2
(45) Date of Patent: Nov. 29, 2022

(54) SMART CONTRACT GENERATION AND EXECUTION SYSTEM WITH BUILT-IN MEDIATOR SELECTION AND ENFORCEMENT TOOLS

(71) Applicant: Microsoft Technology Licensing, LLC, Redmond, WA (US)

(72) Inventors: Ami Turgman, Tel Aviv (IL); Yosef Dinerstein, Haifa (IL); Ashwarya Poddar, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 402 days.

(21) Appl. No.: 16/421,102

(22) Filed: May 23, 2019

(65) Prior Publication Data
US 2020/0372505 A1    Nov. 26, 2020

(51) Int. Cl.
*G06Q 20/40* (2012.01)
*G06Q 20/06* (2012.01)
*G06Q 50/18* (2012.01)

(52) U.S. Cl.
CPC ....... *G06Q 20/405* (2013.01); *G06Q 20/0658* (2013.01); *G06Q 20/407* (2013.01); *G06Q 50/182* (2013.01); *G06Q 50/188* (2013.01)

(58) Field of Classification Search
None
See application file for complete search history.

(56) References Cited

U.S. PATENT DOCUMENTS 6,484,182 B1 * 11/2002 Dunphy ............. G06Q 30/0201
                                                    705/7.29
6,961,858 B2 * 11/2005 Fransdonk ............. G06F 21/10
                                                    705/52
(Continued)

FOREIGN PATENT DOCUMENTS

CN        107122958 A     9/2017
WO     2018204541 A1    11/2018

OTHER PUBLICATIONS

Frantz et al (From Institutions to Code: Towards Automated Generation of Smart Contracts) (Year: 2016).*

(Continued)

*Primary Examiner* — Mamon Obeid
(74) *Attorney, Agent, or Firm* — Fiala & Weaver P.L.L.C.

(57) ABSTRACT

Embodiments described herein are configured to generate a smart contract deployed to a distributed ledger platform. In particular, a first party and a second party negotiate the terms of an engagement, jointly choose a mediator from those available on a social networking platform, and choose a smart contract template, and a user interface is thereafter presented to the parties for inclusion of negotiable elements. Upon agreement, a smart contract is thereafter generated and deployed to a smart contract platform such as, for example, a blockchain. Embodiments permit escrow of funds to the smart contract platform. Embodiments of the smart contract enable the parties to indicate completion or take other actions with respect to the engagement, or to initiate a dispute in which case, a chosen mediator is thereafter enabled by the smart contract to mediate the dispute through one or more smart contract actions made available to the mediator.

20 Claims, 18 Drawing Sheets

(56) References Cited

U.S. PATENT DOCUMENTS

| | | | | |
|---|---|---|---|---|
| 7,020,635 | B2* | 3/2006 | Hamilton | G06Q 30/06 705/52 |
| 7,080,049 | B2* | 7/2006 | Truitt | G06Q 40/02 705/75 |
| 7,090,128 | B2* | 8/2006 | Farley | H04L 67/565 705/57 |
| 7,107,462 | B2* | 9/2006 | Fransdonk | G06Q 20/123 380/282 |
| 7,150,045 | B2* | 12/2006 | Koelle | H04L 63/145 713/193 |
| 7,529,679 | B1* | 5/2009 | Pomerance | G06Q 30/06 705/1.1 |
| 7,587,502 | B2* | 9/2009 | Crawford | A63F 13/77 709/227 |
| 7,711,586 | B2* | 5/2010 | Aggarwal | G06Q 30/0283 705/5 |
| 9,849,364 | B2* | 12/2017 | Tran | G16H 50/30 |
| 9,910,848 | B2* | 3/2018 | Beller | G06F 16/3329 |
| 10,476,847 | B1* | 11/2019 | Smith | H04L 63/102 |
| 10,482,554 | B1* | 11/2019 | Vukich | G06Q 50/188 |
| 11,100,093 | B2* | 8/2021 | Cheng | G06F 16/2255 |
| 11,100,502 | B1* | 8/2021 | Rainey | H04L 9/0891 |
| 2002/0147604 | A1* | 10/2002 | Slate, II | G06Q 30/06 705/64 |
| 2003/0014265 | A1* | 1/2003 | Landry | G06Q 10/10 705/309 |
| 2004/0128155 | A1* | 7/2004 | Vaidyanathan | G06Q 30/06 705/309 |
| 2006/0085253 | A1* | 4/2006 | Mengerink | G06Q 20/3265 705/26.1 |
| 2010/0125526 | A1* | 5/2010 | Hurley | G06Q 30/04 705/34 |
| 2011/0047008 | A1* | 2/2011 | Rule | G06Q 30/0283 705/400 |
| 2012/0198357 | A1* | 8/2012 | Tozzi | G06Q 50/182 715/753 |
| 2013/0203383 | A1* | 8/2013 | Stopel | H04W 4/021 455/411 |
| 2014/0032428 | A1* | 1/2014 | Tozzi | G06Q 50/182 705/309 |
| 2014/0379589 | A1* | 12/2014 | Ratcliffe | G06Q 50/182 705/309 |
| 2016/0335533 | A1* | 11/2016 | Davis | G06Q 40/08 |
| 2017/0109735 | A1* | 4/2017 | Sheng | G06Q 20/3678 |
| 2017/0148118 | A1* | 5/2017 | Fuller | G06Q 50/18 |
| 2017/0206603 | A1* | 7/2017 | Al-Masoud | H04L 9/3236 |
| 2017/0220998 | A1* | 8/2017 | Horn | H04L 51/52 |
| 2017/0232300 | A1* | 8/2017 | Tran | A63B 71/06 434/247 |
| 2017/0256001 | A1* | 9/2017 | Isaacson | G06Q 20/12 |
| 2017/0279774 | A1* | 9/2017 | Booz | G06Q 20/0658 |
| 2017/0287090 | A1* | 10/2017 | Hunn | G06Q 50/18 |
| 2018/0005186 | A1* | 1/2018 | Hunn | G06F 16/93 |
| 2018/0047111 | A1* | 2/2018 | Vieira | H04L 9/50 |
| 2018/0091316 | A1* | 3/2018 | Stradling | G06Q 20/065 |
| 2018/0143995 | A1* | 5/2018 | Bailey | G06F 21/6218 |
| 2018/0218176 | A1* | 8/2018 | Voorhees | G06Q 20/02 |
| 2018/0264347 | A1* | 9/2018 | Tran | A63B 43/004 |
| 2018/0300741 | A1* | 10/2018 | Leonard | G06Q 30/08 |
| 2018/0341648 | A1* | 11/2018 | Kakavand | G06F 16/00 |
| 2018/0343307 | A1* | 11/2018 | Lotter | H04W 12/37 |
| 2019/0034402 | A1* | 1/2019 | Anderson | G06Q 50/18 |
| 2019/0034404 | A1* | 1/2019 | Anderson | G06F 40/186 |
| 2019/0058709 | A1* | 2/2019 | Kempf | H04L 63/0876 |
| 2019/0108140 | A1* | 4/2019 | Deshpande | G06Q 20/3829 |
| 2019/0108232 | A1* | 4/2019 | Calcaterra | G06F 16/958 |
| 2019/0122317 | A1* | 4/2019 | Hunn | H04L 9/3239 |
| 2019/0188787 | A1* | 6/2019 | Besanson Tuma | G06Q 40/02 |
| 2019/0205884 | A1* | 7/2019 | Batra | G06Q 50/18 |
| 2019/0370799 | A1* | 12/2019 | Vivas | H04L 9/3239 |
| 2019/0377904 | A1* | 12/2019 | Sinha | H04L 9/3239 |
| 2019/0392511 | A1* | 12/2019 | Mahajan | G06Q 20/02 |
| 2020/0104958 | A1* | 4/2020 | Cheng-Shorland | G06Q 10/101 |
| 2020/0111187 | A1* | 4/2020 | Vukich | G06Q 20/405 |
| 2020/0118068 | A1* | 4/2020 | Turetsky | H04L 9/0637 |
| 2020/0184431 | A1* | 6/2020 | Sinmao | G06Q 20/3678 |
| 2020/0184556 | A1* | 6/2020 | Cella | G06Q 40/08 |
| 2020/0294128 | A1* | 9/2020 | Cella | G06Q 40/025 |
| 2020/0313982 | A1* | 10/2020 | Todd | H04L 41/5006 |
| 2020/0349561 | A1* | 11/2020 | Kuchkovsky Jimenez | G06F 16/2365 |
| 2020/0364813 | A1* | 11/2020 | Turgman | G06Q 10/06 |
| 2020/0372505 | A1* | 11/2020 | Turgman | G06Q 20/0658 |
| 2020/0380624 | A1* | 12/2020 | Turgman | G06Q 20/02 |
| 2021/0019740 | A1* | 1/2021 | Bhamidipati | G06F 9/5005 |
| 2021/0118051 | A1* | 4/2021 | Gee | G06Q 50/06 |
| 2021/0241273 | A1* | 8/2021 | Abad | G06Q 20/3827 |
| 2021/0248514 | A1* | 8/2021 | Celia | G06V 10/82 |
| 2021/0390191 | A1* | 12/2021 | Doney | G06F 21/604 |

OTHER PUBLICATIONS

Clack, et al., "Smart Contract Templates: Foundations. Design Landscape and Research Directions", In Repository of arXiv: 1608.00771v2, Aug. 3, 2016, pp. 1-15.

"International Search Report and Written Opinion Issued in PCT Application No. PCT/US2020/026025", dated Jun. 29, 2020, 13 Pages.

"Non Final Office Action Issued in U.S. Appl. No. 16/412,026", dated Feb. 22, 2022, 14 Pages.

"Non Final Office Action Issued in U.S. Appl. No. 16/428,611", dated Mar. 17, 2022, 14 Pages.

Choi, Katat, "What could Blockchains offer to Freelancers?", Retrieved from: https://medium.com/swlh/what-could-blockchains-offer-to-freelancers-61019a084f80, May 10, 2018, 12 Pages.

Hertig, Alyssa, "WeChat-Inspired Wallets Are Coming to Ethereum", Retrieved from: https://www.coindesk.com/wechat-wallet-ethereum-blockchain-status, Nov. 30, 2016, 8 Pages.

Marks, Erik, "The Case for Graphical Smart Contract Editors", Retrieved From: https://medium.com/pennblockchain/the-case-for-graphical-smart-contract-editors-8e721cdcde93, Apr. 30, 2018, 4 Pages.

"International Search Repod and Written Opinion Issued in PCT Application No. PCT/US20/026036", dated May 19, 2020, 13 Pages.

"International Search Repod and Written Opinion Issued in PCT Application No. PCT/US2020/024542", dated May 27, 2020, 12 Pages.

Rozario, et al., "Auditing with Smart Contracts", In International Journal of Digital Accounting Research, vol. 18, Feb. 2018, 27 Pages.

"Final Office Action Issued in U.S. Appl. No. 16/428,611", dated May 31, 2022, 18 Pages.

"Notice of Allowance Issued in U.S. Appl. No. 16/412,026", dated Aug. 25, 2022, 10 Pages.

\* cited by examiner https://www.example.com

We agree that provider Bob Brown will perform translation services for consumer Charlie Clark for a reward amount of 100 Finney. Upon signing the contract, the consumer transfers a refund amount of 10 Finney. The refund would be returned to the consumer after contract resolution. Upon signing the contract, the provider transfers a deposit of 20 Finney to be returned after contract resolution. After completion of work, both the provider and the consumer agree to release funds to the provider (the reward and the deposit). If a dispute arises, each of the parties may initiate a dispute to be resolved by mediator David Doe. If called upon to resolve a dispute, David Doe will be entitled to 5 % of the reward amount. Mediator David Doe shall be empowered to resolve the dispute by apportioning release of funds to the parties in any manner he/she sees fit. The contract is sealed when the parties and David Doe sign the contract. — 702

Provider (Bob Brown) deposited 0 Finney — 708

Consumer (Charlie Clark) deposited 0 Finney — 706

The state of the contract is "Pending". — 710

Sign the contract. Transfer 20 Finney upon singing. — 704    712 [ Sign Contract ]

> https://www.example.com

We agree that provider Bob Brown will perform translation services for consumer Charlie Clark for a reward amount of 100 Finney. Upon signing the contract, the consumer transfers a refund amount of 10 Finney. The refund would be returned to the consumer after contract resolution. Upon signing the contract, the provider transfers a deposit of 20 Finney to be returned after contract resolution. After completion of work, both the provider and the consumer agree to release funds to the provider (the reward and the deposit). If a dispute arises, each of the parties may initiate a dispute to be resolved by mediator David Doe. If called upon to resolve a dispute, David Doe will be entitled to 5 % of the reward amount. Mediator David Doe shall be empowered to resolve the dispute by apportioning release of funds to the parties in any manner he/she sees fit. The contract is sealed when the parties and David Doe sign the contract. ⟵702

Provider (Bob Brown) deposited 0 Finney —708

Consumer (Charlie Clark) deposited 0 Finney —706

The state of the contract is "Pending". —710

Sign the contract. Transfer 110 Finney upon singing.—704'  712 [ Sign Contract ]

700B

FIG. 7B https://www.example.com

We agree that provider Bob Brown will perform translation services for consumer Charlie Clark for a reward amount of 100 Finney. Upon signing the contract, the consumer transfers a refund amount of 10 Finney. The refund would be returned to the consumer after contract resolution. Upon signing the contract, the provider transfers a deposit of 20 Finney to be returned after contract resolution. After completion of work, both the provider and the consumer agree to release funds to the provider (the reward and the deposit). If a dispute arises, each of the parties may initiate a dispute to be resolved by mediator David Doe. If called upon to resolve a dispute, David Doe will be entitled to 5 % of the reward amount. Mediator David Doe shall be empowered to resolve the dispute by apportioning release of funds to the parties in any manner he/she sees fit. The contract is sealed when the parties and David Doe sign the contract. ⎯702

Provider (Bob Brown) deposited 20 Finney ⎯708'

Consumer (Charlie Clark) deposited 0 Finney ⎯706

The state of the contract is "Pending". ⎯710

Revert signing and receive the submitted funds back ⎯804   802 [ Revert ]

800

FIG. 8 https://www.example.com

We agree that provider Bob Brown will perform translation services for consumer Charlie Clark for a reward amount of 100 Finney. Upon signing the contract, the consumer transfers a refund amount of 10 Finney. The refund would be returned to the consumer after contract resolution. Upon signing the contract, the provider transfers a deposit of 20 Finney to be returned after contract resolution. After completion of work, both the provider and the consumer agree to release funds to the provider (the reward and the deposit). If a dispute arises, each of the parties may initiate a dispute to be resolved by mediator David Doe. If called upon to resolve a dispute, David Doe will be entitled to 5 % of the reward amount. Mediator David Doe shall be empowered to resolve the dispute by apportioning release of funds to the parties in any manner he/she sees fit. The contract is sealed when the parties and David Doe sign the contract. \\702

Provider (Bob Brown) deposited 20 Finney —708'

Consumer (Charlie Clark) deposited 0 Finney —706

The state of the contract is "Pending". —710

Sign the contract. Transfer 110 Finney upon singing.—704'   712 [ Sign Contract ]

1402 Accept a selection of a smart contract template from a first party or a second party, the first and second party engaging in a transaction and determining the selected smart contract template based at least in part on transaction terms negotiated between the first and second party.

1404 Accept a selected mediator from the first and second party, the selected mediator being jointly chosen by the first and second party.

1406 Generate a smart contract based at least in part on the selected smart contract template and including smart contract terms based at least in part on the transaction terms, the smart contract terms including designation of the selected mediator for resolution of disputes arising under the smart contract, the smart contract enabling one or more smart contract actions to be invoked by one or more of the first party, the second party and the selected mediator.

1408 Instantiate the smart contract in conjunction with a distributed ledger.

1410 Present the smart contract to the first and second party.

1412 Receive acceptance of the smart contract by the first and second party.

FIG. 14

SMART CONTRACT GENERATION AND EXECUTION SYSTEM WITH BUILT-IN MEDIATOR SELECTION AND ENFORCEMENT TOOLS

BACKGROUND

Mobile device technology has evolved to the point where useful business applications may be deployed to smartphones. For example, "gig economy" companies such as Uber and Lyft offer smartphone apps that connect drivers with riders. Similarly, companies like Postmates and DoorDash offer similar apps for providing food ordering and delivery to consumers. In each case, a consumer seeking goods or services uses an app to order the goods or services they desire. The order is thereafter relayed by the gig company to an independent worker, or 'freelancer', who uses the app provided by the gig company to receive the gig (i.e., the task or project).

With these apps, gig companies make it easy for freelancers to find a quick, short term job. Freelancers enjoy the flexibility of the arrangement which can provide them with greater control of their time and finances. Gig companies derive certain benefits as well. First, such companies take a percentage of the overall transaction cost, or impose a fixed fee for putting the freelancer and consumer together. Gig companies also enjoy operating without the overhead of a large number of employees.

The gig economy is not, however, without its problems. Freelancers are under increasing financial pressure as companies continually seek a larger share of each transaction. Consumers of course also bear such pressures in the form of higher prices. Eliminating the middleman (i.e., the gig company) and putting service providers and consumers directly in touch eliminates these issues.

Recently, with the advent of large social networks, it is possible for consumers to easily find service providers without needing an app or other middleman-provided service. For example, one may search on social networks such as LinkedIn for people having the required skill set, and then initiate an engagement with such people directly. For example, one could find a person who specializes in translating documents from one language to another, and then hire them for a one-time document translation project. As another example, social networks such as Upwork™ and Fiverr® may be used to connect consumers with service providers.

These methods of distributing gig work are also not without problems. For one, there is an issue of how a service provider will get paid, and whether the service provider can trust they will, in fact, get paid when the work is complete. Likewise, consumers would like an easy way to pay for gigs, and be certain they will receive their services and not be in danger of being scammed. Moreover, conflicts between the parties may arise without a ready means for resolving the dispute.

Cryptocurrency offers a decentralized means for making direct payments between one or more parties. Distributed ledgers often form the underlying technology of many cryptocurrencies. A blockchain is one type of distributed ledger, and Ethereum is one type of cryptocurrency based thereon. The implementation of Ethereum, and other cryptocurrencies, also provides for so-called 'smart contracts' to operate on and through the blockchain. A smart contract is computer code running on top of the blockchain. The computer code includes rules established by the contracting parties that govern how the transaction will progress and be completed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to generate and allow interaction with a smart contract deployed to a distributed ledger platform. In embodiments, a first party and a second party initiate an engagement and negotiate the terms of the engagement. The first party and second party may also jointly choose a mediator from amongst mediators available on a social networking platform. Thereafter, a smart contract template may be chosen based on the terms, and a user interface is presented to the first and second party for inclusion of negotiable elements. Upon agreement, first and second party may accept the agreement and a smart contract is thereafter generated and deployed to a smart contract platform such as, for example, a blockchain. In conjunction with deployment, embodiments permit the escrow of funds to the smart contract platform. Embodiments of the deployed smart contract enable the first and second party to indicate completion or take other actions with respect to the engagement, or to initiate a dispute. After a dispute is initiated, the previously chosen mediator is thereafter enabled by the smart contract to mediate the dispute through one or more smart contract actions made available to the mediator. Such actions may comprise, for example, determining how escrowed funds ought to be disbursed between the parties.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

FIG. 7A is an example GUI screen in which user interface elements are displayed to a service provider based on querying a smart contract on behalf of the service provider, in accordance with an example embodiment.

FIG. 7B is an example GUI screen in which user interface elements are displayed to a consumer based on querying a smart contract on behalf of the consumer, in accordance with an example embodiment.

FIG. 8 is another example GUI screen in which user interface elements are displayed to a service provider based on querying a smart contract after the service provider has signed the smart contract, in accordance with an example embodiment.

FIG. 9 is yet another example GUI screen in which user interface elements are displayed to a consumer based on querying a smart contract after the service provider has signed the smart contract, in accordance with an example embodiment.

FIG. 14 shows a flowchart of a method for generating a smart contract, in accordance with an example embodiment.

Figure 1:
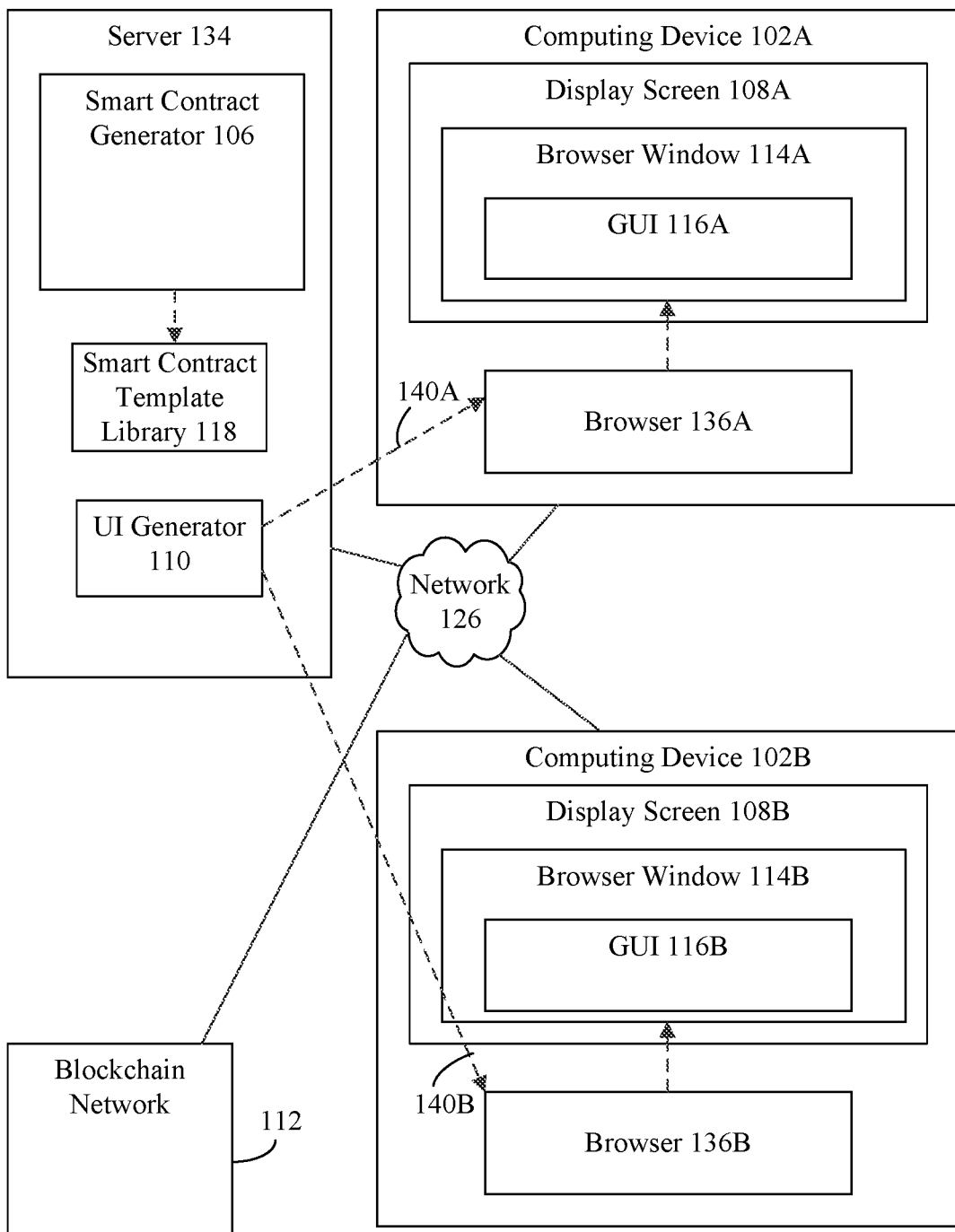
FIG. 1 shows a block diagram of a system for generating a smart contract, in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein provide methods and systems for generating and interacting with a smart contract deployed to a distributed ledger such as, for example, a blockchain. A user interface ("UI") is custom-generated for each party to the smart contract. In particular, a UI is generated that permits a party to select a smart contract template suitable for a given engagement, for suitable contract terms to be provided by one or more parties, and for a smart contract to thereafter be generated and deployed to a distributed ledger. Embodiments also enable parties to specify a mediator to resolve any disputes that may arise during the course of the engagement, and to generate a smart contract including smart contract actions that only the mediator is enabled to perform on behalf of the parties.

In embodiments, a UI representation of the current state of the smart contract may be provided to each party (including a mediator if included in the transaction). Hereinafter, it should be understood that the term "party" or "parties" may also include a mediator, and should not be construed to mean only the principals to the engagement. Furthermore, although embodiments described herein are often couched in terms of two parties to the smart contract, it should be understood that such embodiments are merely exemplary, and other embodiments may in principle include any number of parties. The UI representation provided to a particular party reflects actions that party is enabled to perform and/or has already taken with respect to the smart contract, and likewise may reflect actions taken by other parties (e.g., an action taken by a mediator). In an embodiment, a user experience generator may query the smart contract to determine the current state of the smart contract, and to derive therefrom which UI representations are to be generated and provided to each party via his respective user interface. For instance, the smart contract may comprise functions and/or user experience (UX) annotations that indicate to the user experience generator which user interface representations should be provided to a particular user based on at least one of the identity of the party and a state in which the smart contract is in. Each time the state of the smart contract changes, the smart contract may provide an event notification to the user experience generator, which prompts the user experience generator to query the smart contract to determine the allowed actions for a particular user.

By incorporating the functions and/or UX annotations within the smart contract itself, the user experience generator is not required to internally maintain a state machine that tracks the state of the smart contract. Instead, the user interface leverages the state maintained by the smart contract itself, and simply queries the smart contract to determine whether a particular action is allowable for a particular party to the smart contract whenever the state of the smart contract changes. This advantageously removes any state synchronization required between a user interface and the smart contract. Accordingly, the functioning of computers on which the user experience generator executes is improved. In particular, processor cycles, memory, etc. of such computers are conserved as such computers do not need to maintain the state machine and process the state changes of the state machine. Instead, as described herein, the user experience generator simply queries the smart contract itself to determine its state. Moreover, because the manner in which user interface elements to be rendered are determined is greatly simplified, such user interface elements are rendered faster.

FIG. 1 shows a system 100 for generating a smart contract, according to an example embodiment. As shown in FIG. 1, system 100 includes a computing device 102A, a computing device 102B, a server 134, and a blockchain network 112. Server 134 includes a smart contract generator 106, a smart contract template library 118 (e.g., in storage), and a user interface (UI) generator 110. Computing device 102A includes a display screen 108A and a browser 136A, and computing device 102B includes a display screen 108B and a browser 136B. System 100 is described as follows. It is noted that while system 100 includes two computing devices 102A and 102B, system 100 may include any number of computing devices. For example, one such computing device may be used by each party to a smart contract, including a mediator if specified.

Computing devices 102A and 102B may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Server 134 may include one or more server devices and/or other computing devices. For example, server 124 may include a Web server, an application server, and/or a database.

Computing devices 102A and 102B and server 134 may each include at least one network interface that enables communications with each other over network 126. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN), a personal area network (PAN), and/or a combination of communication networks, such as the Internet.

Blockchain network 112 may comprise a decentralized, distributed blockchain computing platform maintained by a plurality of nodes (e.g., computing devices). Blockchain network 112 enables developers to build and execute decentralized applications, such as smart contracts, that run on blockchain technology. Any type of distributed ledger platform that offers smart contracts may be utilized for blockchain network 112. An example of blockchain network 112 includes, but is not limited to, Ethereum. Blockchain network 112 may be communicatively coupled to server 134 and/or computing devices 102A and 102B via network 126.

Smart contract generator 106 is configured to be operated/interacted with to create a smart contract between at least two users (e.g., a service provider and a consumer), wherein the smart contract is configured to be executed on blockchain network 112. For instance, a first user (e.g., the service provider) may access smart contract generator 106 by interacting with an application at computing device 102A capable of accessing a network-based application, such as browser 136A, and a second user (e.g., the consumer) may access smart contract generator 106 by interacting with an application at computing device 102B capable of accessing a network-based application, such as browser 136B. The first user may use browser 136A to traverse a network address (e.g., a uniform resource locator) to smart contract generator 106, which invokes a GUI 116A (e.g., a web page) in a browser window 114A. Similarly, the second user may use browser 136B to traverse the network address to smart contract generator 106, which invokes GUI 116B in a browser window 114B. It is noted that any number of users may participate in creating a smart contract via smart contract generator 106. For example, and as will be discussed in more detail below, the service provider and consumer may elect to include mediation terms in the smart contract, including identification of a designated mediator. In such instances, the selected mediator may likewise participate in creating the smart contract inasmuch as the mediator must signal his/her agreement to mediate any disputes per the express terms of the contract (e.g., by signing the contract).

UI generator 110 is configured to transmit GUI information 140A (e.g., one or more web pages, image content, user interface elements, code (e.g., JavaScript) etc.) to browser 136A to be displayed and/or executed as GUI 116A in browser window 114A of display screen 108A and transmit GUI information 140B to browser 136B to be displayed as GUI 116B in browser window 114B of display screen 108B. GUI 116A and GUI 116B may be interacted with by users to draft a smart contract. The smart contract may be based on a smart contract template selected by the user from a plurality of smart contract templates stored in smart contract template library 118, although the embodiments described herein are not so limited. Each of the smart contract templates may be stored as one or more files. For example, a first file may specify template language of the contract (e.g., various predetermined terms, conditions, clauses, etc.). The first file may be referred to as a definition file. Such template language may be formatted as a string. The definition file may also specify one or more variables corresponding to one or more terms of the smart contract that are user-specifiable via GUI 116A and GUI 116B. Examples of such user-specifiable terms include, but are not limited to, a description of the goods to be provided (and the quantity therefor) and/or services to be rendered (and the date on which the services are to be rendered), the names of the parties of the contract (e.g., the name of the content provider, consumer, buyer, seller, etc.), payment terms, a mediator in an event of a dispute, etc. The definition file may be formatted in accordance with a JavaScript Object Notation (JSON) format, although the embodiments are not so limited. For example, the definition files may be formatted in accordance with an Extensible Markup Language (XML) format or any other format suitable for organizing and/or transmitting data.

A second file associated with a smart contract template may comprise the source code of the smart contract. The second file may be referred to as a source code file. The source code specifies a set of rules under which the parties to the smart contract agree to interact with each other. If and when the rules are met, the agreement is automatically enforced. The smart contract code facilitates, verifies, and enforces the negotiation or performance of the agreement. The source code may be written in a programming language suitable for compilation and execution by a virtual machine executing in blockchain network 112. For instance, in an embodiment in which blockchain network 112 is an Ethereum blockchain network, the source code may be written in the Solidity programming language, although the embodiments described herein are not so limited. The source code may reference the data and/or variables specified by the definition file. As will be described below, during deployment of the smart contract to blockchain network 112, the data and/or variables may be replaced by the values specified for such data and/or variables during smart contract generation and/or compilation. It is noted that the usage of a definition file and/or source code for each smart contract template is just one possible implementation and that any number of files may be used for any given smart contract template.

To render the selected contract template via GUI 116A and/or GUI 116B, UI generator 110 may provide information 140A and 140B to GUI 116A and GUI 116B, respectively, that causes GUI 116A and GUI 116B to render the smart contract template in accordance with the associated definition file. For instance, the smart contract template terms may be displayed via GUI 116A and/or GUI 116B as human-readable text, and the variables may be displayed as user-interactive elements (e.g., text boxes, pull-down menus, etc.) that enable the users to specify user-specifiable terms of the smart contract.

Figure 2:
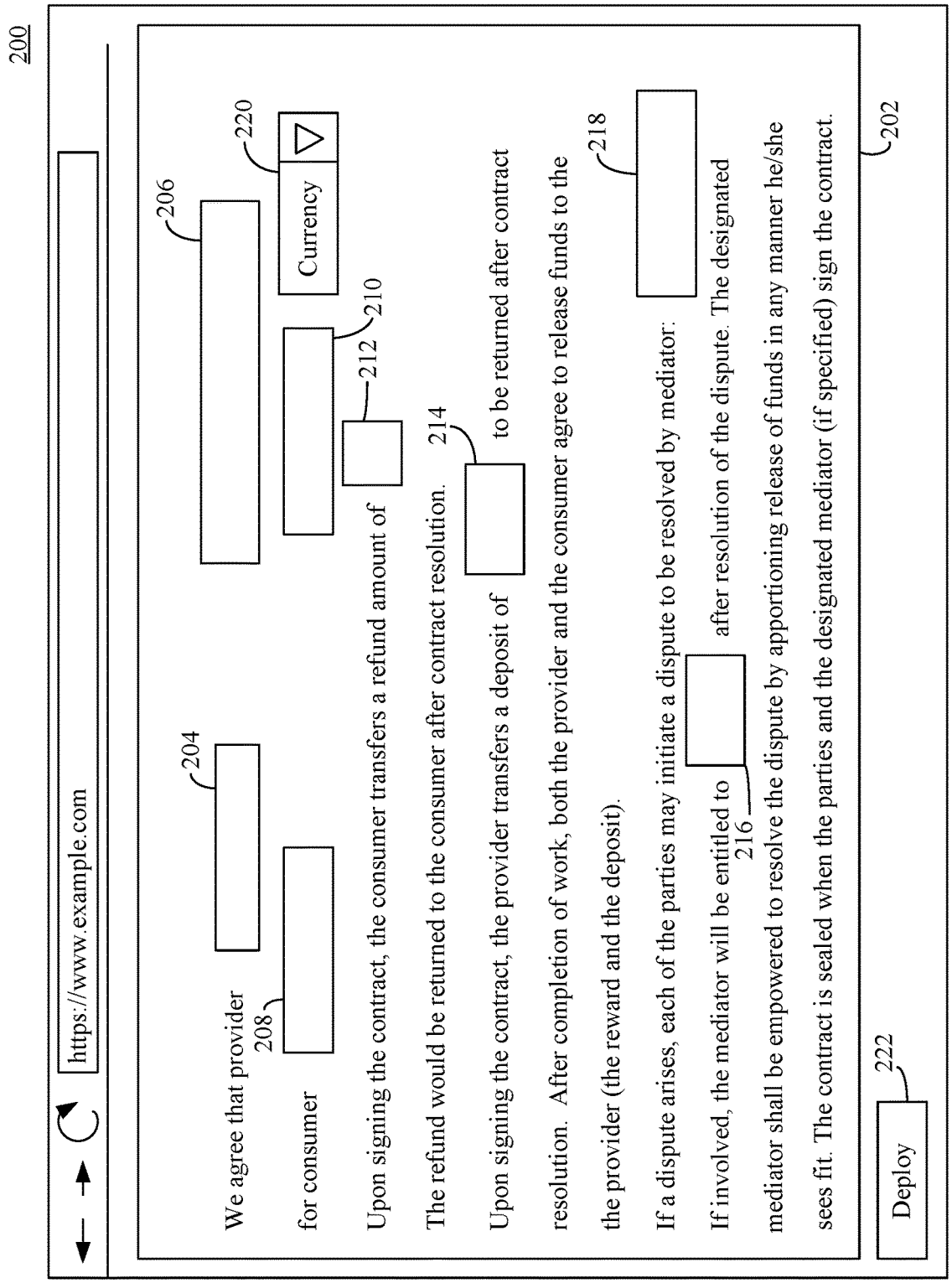
FIG. 2 is an example GUI screen that depicts a smart contract template, in accordance with an embodiment.

Any number of users may be enabled to interact with contract generator 106 via their respective GUIs to cooperatively negotiate contract terms of the smart contract. For instance, users may be presented with a smart contract template, as selected by at least one of the users in their respective GUI (i.e., GUI 116A, GUI 116B, etc.). For example, FIG. 2 is an example GUI screen 200 that depicts a smart contract template 202 in accordance with an embodiment. As shown in FIG. 2, a user, using a browser (e.g., browser 136A), has traversed to a network address (e.g., www.example.com) corresponding to smart contract generator 106 and has selected template contract 202. GUI 116A renders smart contract template 202 in browser window 114A in accordance with the smart contract template's associated definition file. The same smart contract template may be displayed for a second user that agreed to collaboratively draft a contract with the first user. For instance, the second user, using browser 136B may traverse to the network address corresponding to smart contract generator 106 and view smart template contract 202 via browser window 114B.

As shown in FIG. 2, smart contract template 202 comprises a human-readable text and a plurality of user interface elements 204, 206, 208, 210, 212, 214, 216, 218, and 220. The human-readable text represents template language in the associated definition file. Each of user interface elements 204, 206, 208, 210, 212, 214, 216, 218, and 220 represents a variable in the definition file. Each of user interface elements 204, 206, 208, 210, 212, 214, 216, and 218 may be text boxes that enable a user to specify certain terms of the contract. For example, user interface element 204 enables a user to specify the name of the provider, user interface element 206 enables a user to specify the type of service to be rendered, user interface 208 enables a user to specify the name of the consumer, user interface element 210 enables a user to specify the amount of funds to be paid to the provider, user interface element 212 enables a user specify the a refund amount to be paid by the consumer, user interface element 214 enables a user to specify a deposit amount to be paid by the provider, user interface element 216 enables a user to specify a percentage of the reward that a mediator is given upon dispute resolution, and user interface element 218 enables a user to specify the name of the mediator.

In an embodiment, user interface element 218 may instead comprise a drop down pre-populated with a list of available mediators. The list may reflect, for example, user preferences or mediators that a user has previously employed. Alternatively, the list may comprise a curated list of mediators, with such mediators being included base on, for example, a third-party vetting process. Alternatively, the list of mediators may include a reputation score or some other indicia of reputation associated with the mediator. For example, embodiments disclosed herein may be hosted by a social network platform, and mediators may be selected from among the mediators with a profile on the platform, and based at least in part on the reputation of the mediator (e.g., as reflected by upvotes or reviews of some type).

User interface element 220 may be a pulldown menu that enables a user to specify the type of currency to be used for the payment amount (e.g., cryptocurrency (or a unit thereof) supported by blockchain network 112). It is noted that the usage of text boxes for user interface elements 204, 206, 208, 210, 212, 214, 216, 218 and the usage of a pulldown menu for user interface 220 is purely exemplary and that other types of user interface elements may be utilized to enable a user to specify contract terms.

Users may collaboratively fill out smart contract template 202 via a communication session (e.g., via phone, chat, video chat, etc.), where each user is enabled to specify the terms of smart contract template 202 based on the conversation between the users. When a particular user makes a modification to a contract term, the modification is also reflected on the other users' respective GUI. For instance, if a first user specifies a provider name via user interface 204 using GUI 116A, UI generator 110 provides the specified provider name to the second user's GUI (e.g., GUI 116B), which is updated to reflect the specified value.

After the users finalize the terms of the smart contract, the smart contract may be deployed to blockchain network 112 for execution thereby. For instance, a user may interact with a user interface element 222, which, when activated, deploys the finalized contract to blockchain network 112.

Figure 3:
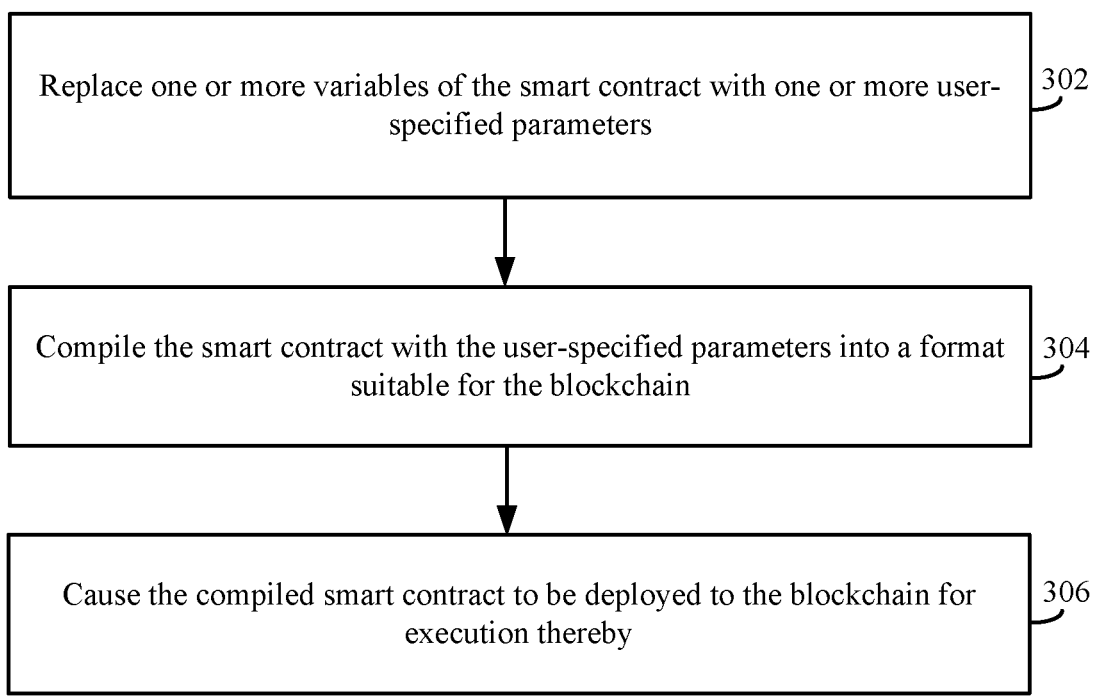
FIG. 3 shows a flowchart of a method for deploying a smart contract to a blockchain maintained by a computing platform, in accordance with an example embodiment.
Figure 4:
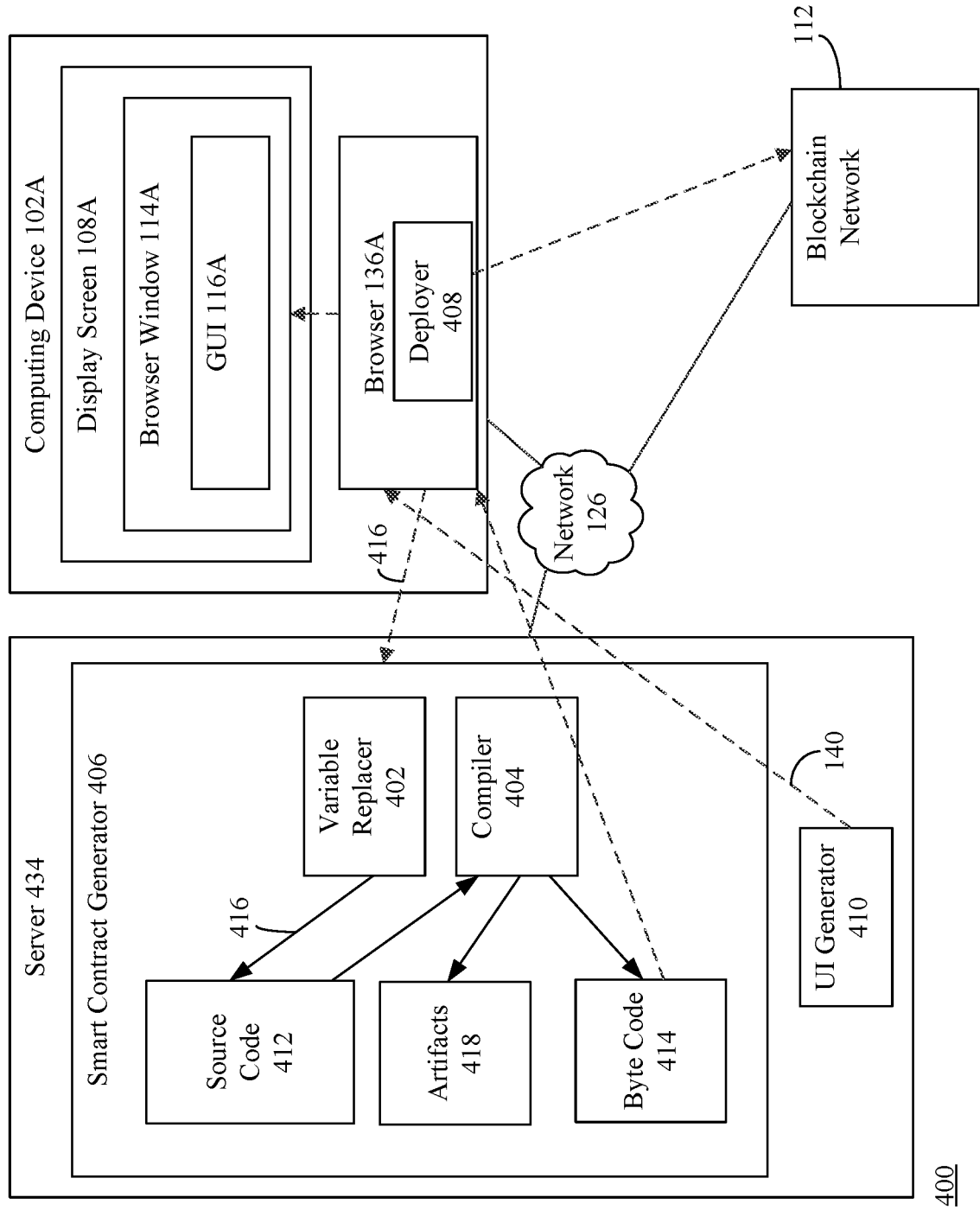
FIG. 4 shows a block diagram of a system for deploying a smart contract to a blockchain maintained by a computing platform, in accordance with an example embodiment.

FIG. 3 shows a flowchart 300 of a method for deploying a smart contract to a blockchain maintained by a computing platform in accordance with an example embodiment. In an embodiment, flowchart 300 may be implemented by a system 400 shown in FIG. 4, although the method is not limited to that implementation. FIG. 4 shows a block diagram of system 400 for deploying a smart contract to a blockchain maintained by a computing platform in accordance with an example embodiment. System 400 is an example of system 100, as described above with reference to FIG. 1. As shown in FIG. 4, system 400 comprises a server 434, which is an example of server 134. System 400 further includes, computing device 102A and blockchain network 112, as described above with reference to FIG. 1. Computing device 102B is not shown for brevity. Server 434, computing device 102A and blockchain network 112 are communicatively coupled via network 126. Network 426 is an example of network 126, as described above with reference to FIG. 1. As further shown in FIG. 4, server 434 comprises a smart contract generator 406 and a UI generator 410. Smart contract generator 406 comprises a variable replacer 402 and a compiler 404. As also shown in FIG. 4, browser 136A is configured to execute a deployer 408. Smart contract generator 406 and UI generator 410 are examples of contract generator 106 and UI generator 110, as described above with reference to FIG. 1. Other structural and operational embodiments will be apparent to persons skilled in the relevant art(s) based on the discussion regarding flowchart 300 and system 400 of FIG. 4.

Flowchart 300 begins with step 302. In step 302, variable(s) of the smart contract are replaced with one or more user-specified parameters. For example, with reference to FIG. 4, after the user-specified parameters of the smart contract being negotiated are finalized via smart content generator GUI 116A, the user-specified terms (shown as user-specified parameters 416) are provided to smart contract generator 106 via browser 136A. Variable replacer 402 of smart contract generator 406 may be configured to replace the variables in the smart contract source code file (shown as source file 412) associated with the smart contract template with user-specified parameters 416.

In step 304, the contract is compiled with the user-specified parameters into a format suitable for the blockchain. For example, with reference to FIG. 4, compiler 404 may be configured to compile source code file 412 with the user-specified parameters 416 into a format suitable for the blockchain maintained by blockchain network 112. For instance, compiler 404 may compile source code file 412 into byte code 414. In an embodiment in which source code file 412 is written in the Solidity programming language, compiler 404 may be a Solidity-based compiler. In an embodiment in which blockchain network 112 is an Ethereum blockchain network, byte code 414 may be Ethereum Virtual Machine (EVM) byte code. The compilation process may also generate a compilation artifacts file 418. Compilation artifacts file 418 may comprise a description of smart contract methods and UX annotations included in the smart contract (which are further described below with reference to FIG. 6). Compilation artifacts file 418 may be stored in storage (e.g., a database) communicatively coupled to server 434. Compilation artifacts file 418 may be formatted in accordance with the JSON format; however, the embodiments described herein are not so limited.

In step 306, the compiled smart contract is caused to be deployed to the blockchain for execution thereby. For example, with reference to FIG. 4, smart contract generator 406 may provide byte code 414 to browser 136A. deployer 408 executing in browser 136A may be configured to deploy the compiled smart contract (e.g., byte code 414) to the blockchain maintained by blockchain network 112 for execution thereby. For instance, a virtual machine (e.g., an Ethereum virtual machine (EVM) of blockchain network 112) may execute byte code 414. Smart contract generator 406 may provide byte code 414 to browser 136A via network 126 using an application programming interface (API), such as, but not limited to a Representational State Transfer (REST) API. Deployer 408 may provide byte code 414 to blockchain network 112 via network 126 using an API, such as a Metamask API.

Figure 5:
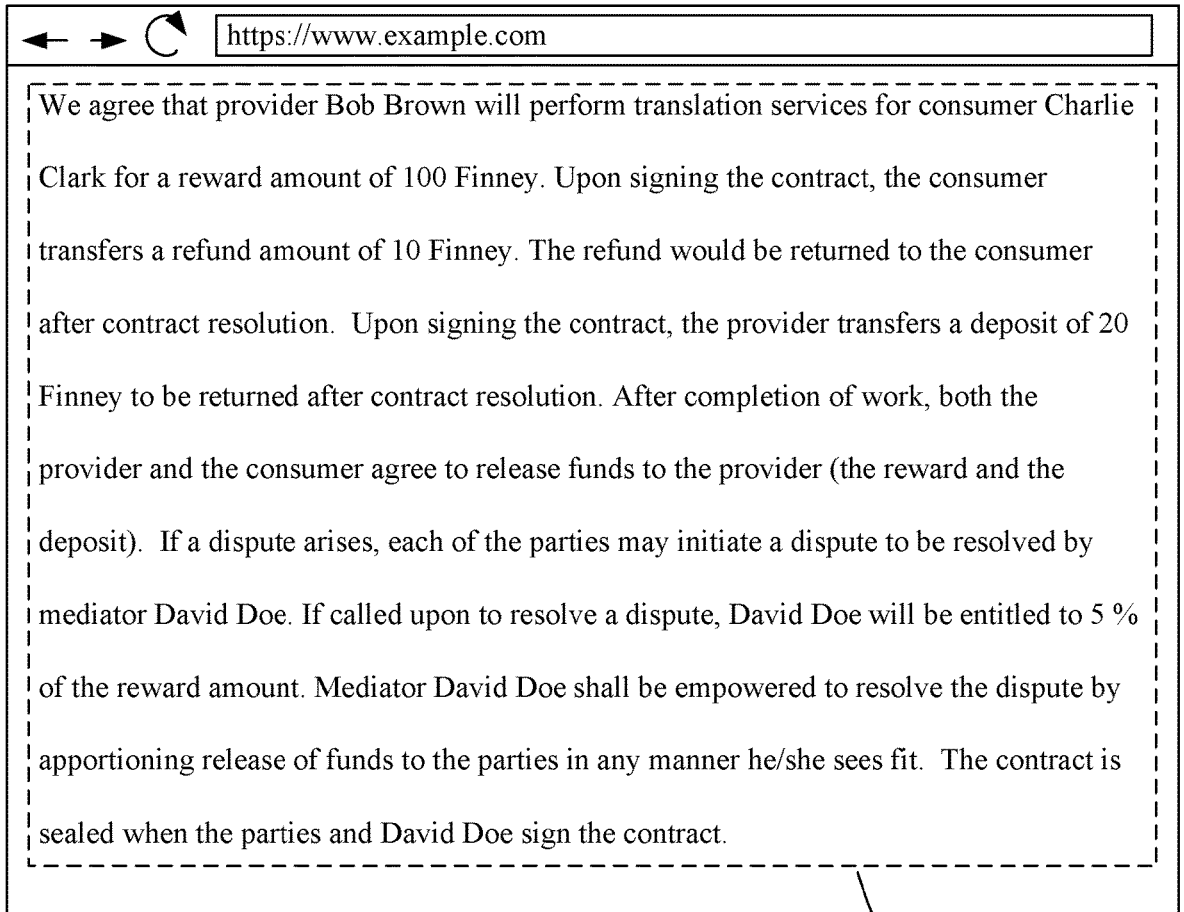
FIG. 5 shows an example GUI screen in which an immutable version of an agreed upon smart contract is shown, in accordance with an example embodiment.

After the smart contract has been deployed to blockchain network 112, the smart contract becomes immutable (i.e., the contract language and contract terms are no longer editable and are read-only). In accordance with an embodiment, the immutable version of the smart contract (shown as text 502) is displayed to all the parties to the smart contract (e.g., via GUI 116A, GUI 116B, etc.). For example, FIG. 5 shows an example GUI screen 500 in which an immutable version of the agreed upon smart contract is shown. As shown in FIG. 5, user interface elements 204, 206, 208, 210, 212, 214, 216, 218, and 220 (shown in FIG. 2) are no longer displayed. Instead, the parameters specified by a user for each of user interface elements 204, 206, 208, 210, 212, 214, 216, 218, and 220 are displayed in placed thereof, and a noneditable, finalized version of the smart contract is shown.

In accordance with an embodiment, certain user interface representations may be generated and presented to the user after the smart contract is deployed to blockchain network 112 that provides a status with respect to the smart contract and/or enable an action to be taken with respect to the smart contract. Such actions include, but are not limited to, depositing funds (into escrow or otherwise), withdrawing funds, executing the smart contract, initiating a dispute, etc. The user interface elements that are displayed may vary depending on the user viewing the smart contract and/or the state in which the smart contract is in. The foregoing techniques are described below.

Figure 6:
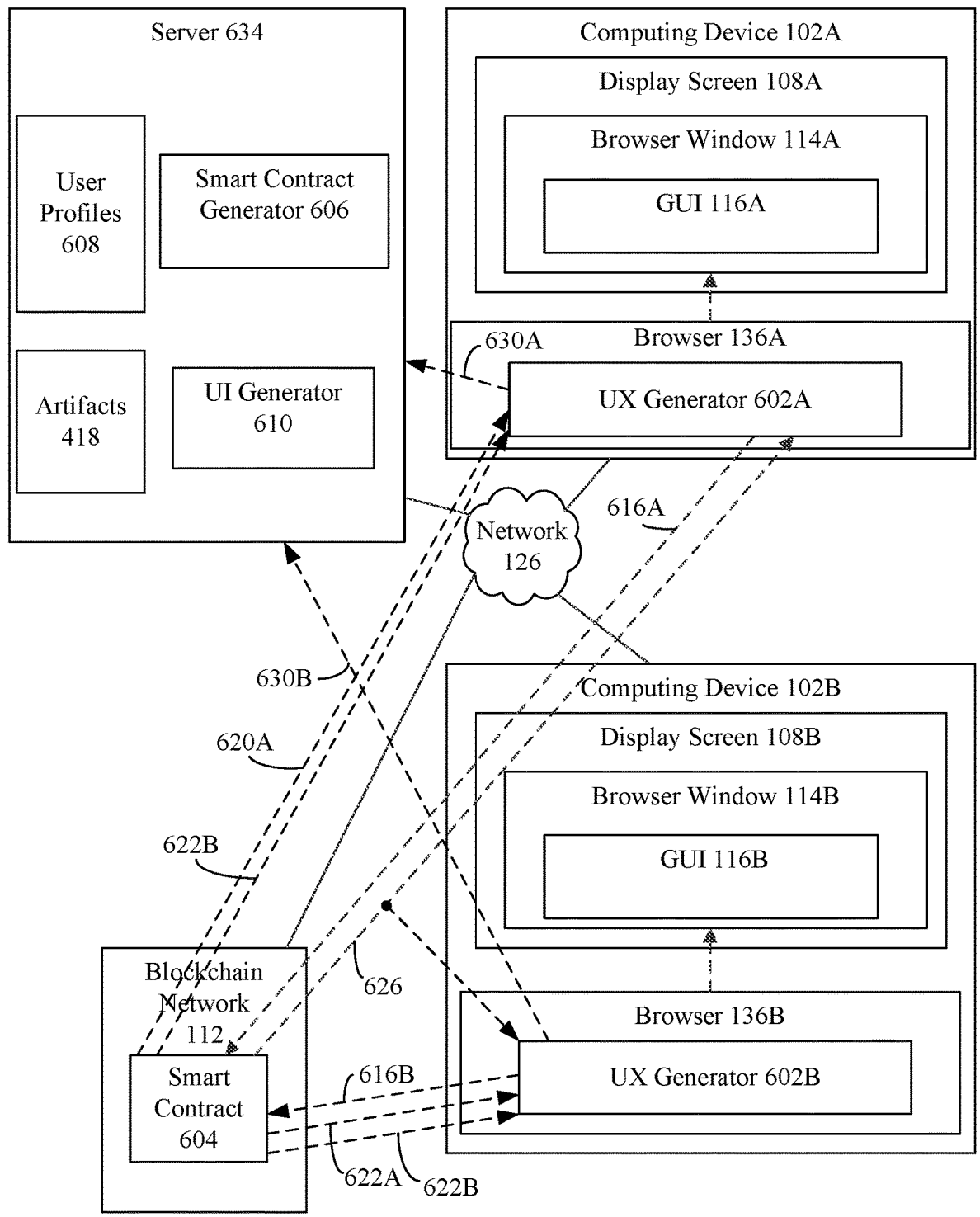
FIG. 6 shows a block diagram of system for presenting a user interface representation of an action a user is enabled to take with respect to a smart contract, in accordance with an example embodiment.

For instance, FIG. 6 shows a block diagram of system 600 for presenting a user interface representation of an action a user is enabled to take with respect to the smart contract in accordance with an example embodiment. System 600 is an example of system 100, as described above with reference to FIG. 1, and system 400, as described above with reference to FIG. 4. As shown in FIG. 6, system 600 comprises a server 634, which is an example of server 134, as described above with reference to FIG. 1, and server 434, as described above with reference to FIG. 4. System 600 also includes computing device 102A, computing device 102B and blockchain network 112, as described above with reference to FIGS. 1 and 4. Server 634, computing device 102A, computing device 102, and blockchain network 112 are communicatively coupled via a network 126. As further shown in FIG. 6, server 634 comprises a smart contract generator 606, which is an example of smart contract generator 106 and smart contract generator 406, as respectively described above with reference to FIGS. 1 and 4, and a UI generator 610, which is an example of UI generator 110 and 410, as described above with reference to FIGS. 1 and 4. As further shown in FIG. 6, a smart contract 604 is deployed to blockchain network 112 (in accordance with the description provided above with reference to FIGS. 3 and 4). For instance, smart contract 604 may correspond to byte code 414 described above with reference to FIG. 4. As also shown in FIG. 6, a UX generator 602A is shown executing in browser 136A and a UX generator 602B is shown executing in browser 136B.

UX generator 602A and 602B may be configured to determine which UI elements are to be presented to different users of smart contract generator 606 (e.g., via GUI 116A and GUI 116B, respectively). UX generator 602 may determine the UI elements to be presented based on a state in which smart contract 604 is in and/or the identity of the user viewing smart contract 604.

The state in which smart contract 604 is in may be determined based on event notifications that are provided by smart contract 604 to UX generator 602A and/or 602B. For instance, each time an event occurs with respect to smart contract 604, smart contract 604 may provide an event notification 626 to UX generator 602A and 602B that identifies that an event has occurred (e.g., a state change has occurred, a user has signed smart contract 604, a user has deposited funds associated with smart contract 604, etc.). Examples of states include, but are not limited to a pending state, a sealed state, a disputed state, or a completed state. Smart contract 604 is in a pending state when at least one of the parties to smart contract 604 has not signed smart contract 604. Smart contract 604 is in a sealed state after each of the parties to smart contract 604 have signed smart contract 604. Smart contract 604 is in a disputed state when at least one of the parties have initiated a dispute with respect to smart contract 604. Smart contract 604 is in a completed state after all the obligations and/or duties of each party to smart contract 604 is completed. It is noted that that the states described above are purely exemplary and that smart contract 604 may comprise any number and/or types of states.

UX generator 602A and/or 602B may determine the identity of the user based on a user profile associated with the user. For instance, server 634 may maintain user profiles 608 for different users that utilize smart contract generator 606. A user may be required to login to a website that provides smart contract generator 606, for example, using a username and/or password. Smart contract generator 606 may maintain the login information when a user logs into the website and may associate the login information with the user's profile. The user profile may include information associated with the user (e.g., name, address, interests, Ethereum ID, etc.). UX generator 602A and/or 602B may access the user's profile upon the user logging into the website and determine the identity of the user based on the information included in that user's profile. Alternatively, browser 136A may store an identifier (e.g., a username) that identifies the user utilizing GUI 116A, and browser 136B may store an identifier that identifies the user utilizing GUI 116B. UX generator 602A may provide a query to browser 136A and UX generator 602A may provide a query to browser 136B and obtain the user identifier therefrom.

The code of smart contract 604 may comprise functions (e.g., procedures or methods) that, when executed perform a particular action with respect to the smart contract. Such actions include, but are not limited to, depositing funds, withdrawing funds, executing the smart contract, initiating a dispute, etc. Such functions may be referred to as smart contract methods. In other embodiments, however, smart contract procedures and/or methods need not perform actions, but may instead be invoked for other purposes (e.g., to obtain information from the contract). For example, and as will be discussed in more detail below, a smart contract method may query the smart contract to determine the names of each party for the purposes of generating and rendering GUI 116A or GUI 116B.

Each of the smart contract methods may be associated with a complementary function that is also included in the code. Each complementary function may be utilized by UX generator 602A and/or 602B to determine whether or not a user interface element associated with the action of its corresponding smart contract method is to be provided to a particular user, thereby enabling that user to perform that action. For instance, when coding smart contract 604 (e.g., using the Solidity language), the programmer may code a complementary function for each smart contract method. Each complementary function may be configured to receive at least the state of the smart contract and/or the identity of the user as inputs. Each complementary function may further specify one or more condition(s) that are required for the user interface element to be provided to the user smart contract method to be called (e.g., the contract must be in a signed state and the identity of the user must either be a service provider and/or a consumer). Note also, and as mentioned above, such functions may also be used by UX generator 602A and/or UX generator 602B to query the smart contract for data used to populate one or more text fields of the rendered GUI, and need not be restricted to smart contract actions or GUI rendering related thereto.

Upon receiving event notification 626 from smart contract 604 during the execution thereof, UX generator 602A and 602B may query server 634 for information stored via compilation artifacts file 418 to obtain a description of each of the smart contract method calls, the complementary smart contract method calls and/or the UX annotations associated with smart contract 604. For instance, UX generator 602A may provide a query 630A to server 634 for information stored via compilation artifacts file 418, and UX generator 602B may provide a query 630B to server 634 for information stored via compilation artifacts file 418. In response, server 634 may provide a listing of the smart contract methods, complementary smart contract methods, and/or UX annotations included in smart contract 604 to UX generator 602A and/or 602B.

Using the listing, UX generator 602A and 602B may query each complementary function via one or more queries 616A and 616B, respectively, on behalf each user associated with smart contract 604 to determine whether a corresponding UI element should be provided to the user. For instance, when querying smart contract 604 on behalf of a first user, query 616A may include an identifier of the first user. When querying smart contract 604 on behalf of a second user, query 616B may include an identifier of the second user. If the condition(s) of a particular complementary function are met, the complementary function returns a positive response 620A and/or 620B to UX generator 602A and/or 602B, respectively, that indicates that a corresponding user interface element with respect to the associated smart contract method should be provided to the user. In response, UX generator 602A provides a representation of the user interface element to GUI 116A via browser 136A and/or UX generator 602B provides a representation of the user interface element to GUI 116B via browser 136B for displaying thereby. If the condition(s) are not met, the complementary function returns a negative response 622A and/or 622B to UX generator 602A and/or UX generator 602A, respectively, that indicates that no user interface element should be provided to the user with respect to the associated smart contract method.

The user interface element may be a user-interactive element, such as a button, that is displayed via GUI 116A and/or contact generator GUI 116B. The user interface element may also be a text string that, for example, provides a status update with reference to an action taken with respect to smart contract 604. The text string may be based on an annotation included in the code of smart contract 604. Such annotations may be referred to as user experience (UX) annotations, as they affect the user interface (e.g., GUI 116A and/or GUI 116B) utilized by the user. The annotation may be included in the code by a programmer. The annotations may be appear as comments to the compiler that compiles the source code of smart contract 604 (e.g., compiler 404, as shown in FIG. 4). UX annotations may comprise a textual string. UX annotations may also comprise one or more variables utilized by smart contract 604 and that are populated during execution of smart contract 604. The variables may be representative of user identities, fund amounts, etc. UX generator 602A and/or 602B may be configured to utilize such UX annotations to generate user interface elements (e.g., text strings). The UX annotations may be associated with the complementary functions described above. For instance, such UX annotations may be included within such complementary functions or included proximate to such complementary functions (e.g., located before after such complementary functions). Compilation artifacts file 418 may indicate which UX annotations are associated with a particular complementary function. If a complementary function provides a positive response, UX generator 602A and/or 602B may utilize the information received for compilation artifacts file 418 to determine which UX annotations are associated with the complementary functions that provided positive response 620A and/or 620B. UX generator 602A and/or 602B may display the associated UX annotations as a text string. Any variables included in such UX annotations are replaced by the values for such variables, as determined by smart contract 604.

Certain UX annotations may be provided in the code of smart contract 604 that are independent of a complementary function. For instance, certain UX annotations may provide the current state of smart contract 604. Such UX annotations may also be specified via compilation artifacts file 418. Each time smart contract 604 provides an event notification (e.g., event notification 626A and/or 626B), UX generator 602A and/or 602B may display such UX annotations as a text string utilizing the information received for compilation artifacts file 418. Any variables included in such UX annotations are replaced by the values for such variables, as determined by smart contract 604.

Because certain user interface elements may be conditioned based on the identity of the user, the user interface generated may differ from user to user for any given smart contract. Moreover, because certain user interface elements may be conditioned on the state of the smart contract, the user interface generated may dynamically change when the state of smart contract changes. For example, suppose a service provider named in smart contract 604 utilizes computing device 102A to view and/or interact with a representation of smart contract 604 via GUI 116A, and a consumer named in smart contract 604 utilizes computing device 102B to view and/or interact with a representation of smart contract via GUI 116B. After smart contract 604 is deployed, UX generator 602A and/or 602B may query each complementary function via one or more queries 616A and/or 616B, respectively, and/or query server 634 (via queries 630A and/or 630B, respectively) to determine whether a user interface element associated with each complementary function is to be rendered via GUI 116A and/or GUI 116A and/or to determine whether any UX annotations are to be displayed via a text string to be rendered via GUI 116A and/or GUI 116A.

At this stage, smart contract 604 is in the pending state, as neither content provider nor consumer have signed the contract. Accordingly, the complementary functions associated with smart contract methods for executing (i.e., signing) the contract may return a positive result and cause a user interface element to be rendered on both of GUI 116A and GUI 116A. For example, FIG. 7A is an example GUI screen 700A in which user interface elements are displayed to a service provider based on querying smart contract 604 on behalf of the service provider in accordance with an example embodiment, and FIG. 7B is an example GUI screen 700B in which user interface elements are displayed to a consumer based on querying smart contract 604 on behalf of the consumer in accordance with an example embodiment. As shown in FIGS. 7A and 7B, text 702 representing an immutable version of a smart contract 604 is provided via a GUI (e.g., GUI 116A and GUI 116B).

In FIG. 7A, below text 702 are various interface elements 704, 706, 708, 710, and 712 that are displayed based on querying smart contract 604 on behalf of the service provider. For instance, after deploying smart contract 604 to blockchain network 112, smart contract 604 may provide event notification 626 to UX generator 602A that indicates that smart contract 604 has changed state (i.e., smart contract 604 is in a pending state). In response, UX generator 602A may query each of the complementary functions of smart contract 604 on behalf of the service provider of smart contract 604. In the example shown in FIG. 7, a first complementary function associated with a smart contract method for signing the smart contract and a second complementary function associated with a smart contract method associated with depositing funds may all provide a positive result. Accordingly, user interface elements 704, 706, and 712 are displayed. For example, the conditions for displaying user interface elements 704 and 712 may be that smart contract 604 is in a pending state and the identity of the user (as indicated in the query to smart contract 604) is a service provider associated with smart contract 604. The conditions for displaying user interface elements 706 and 708 may be that smart contract 604 is in a pending state, the identity of the user is a service provider or a consumer, and that the service provider and the consumer have not deposited funds.

User interface elements 704, 706, and 708 are text strings corresponding to UX annotations included in the code of smart contract 604 and/or compilation artifacts file 418, and user interface element 712 is a button. The UX annotation represented by user interface element 704 may include a variable representative of the amount that the service provider is to deposit with respect to smart contract 604. Variable is populated by a value specified by the parties during smart contract negotiation. In the example shown in FIG. 7, because smart contract 604 is queried on behalf of the service provider, the value "20" populates the variable, as it represents the amount that the service provider is to deposit at the time of signing. User interface element 710 may be a UX annotation that is independent of a complementary function. user interface element 710 may be displayed as a result of UX generator 602A and/or 602B analyzing the information received for compilation artifacts file 418. For instance, the information may specify that the UX annotation is to be responsive to receiving displayed regardless of any complementary function returning a positive response.

In FIG. 7B, below text 702 are interface elements 704', 706, 708, 710, and 712 that are displayed based on querying smart contract 604 on behalf of the consumer. For instance, after deploying smart contract 604 to blockchain network 112, smart contract 604 may provide event notification 626 to UX generator 602B that indicates that smart contract 604 has changed state (i.e., smart contract 604 is in a pending state). In response, UX generator 602B may query each of the complementary functions of smart contract 604 on behalf of the consumer of smart contract 604. In the example shown in FIG. 7B, the same complementary functions described above with reference to FIG. 7A provide a positive result. Accordingly, user interface elements 706 and 712 are displayed. User interface element 710 is displayed in a similar manner as described above with reference to FIG. 7A. However, with reference to user element interface 704,' because the first complementary function is queried on behalf of the consumer, the variable included in the UX annotation is populated by the agreed-upon amount that the consumer is to deposit upon signing the contract (i.e.,"110 Finney").

Referring again to FIG. 6, now suppose that the service provider signs smart contract 604 by activating user interface element 712 of FIG. 7A (e.g., by pressing user interface element 712 via an input device, such as a mouse). Upon activating user interface element 712, GUI 116A may send a command to UX generator 602A via browser 136A that causes UX generator 602A to call the smart contract method for signing smart contract 604. After smart contract 604 is successfully signed by the service provider and/or the required funds are deposited, smart contract 604 may provide event notification 626 to UX generator 602A that indicates smart contract 604 has been signed by a party. In response, UX generator 602A queries each of the complementary functions of smart contract 604 via one or more queries 616 (as specified in the information associated with compilation artifacts file 418) to determine which actions that the service provider and the consumer are allowed to perform and the user interface elements corresponding to such actions that are to be provided to the users. the GUI provided to service provider will differ from the GUI provided to consumer. In particular, user interface elements 704 and 712 will no longer be provided to the service provider (via GUI 116A), as he has already signed the contract. However, user interface elements 704 and 712 will still be provided to the consumer's GUI (e.g., GUI 116B) because he has not yet signed the contract. Examples of such GUI screens are provided below with reference to FIGS. 8 and 9.

For example, FIG. 8 is an example GUI screen 800 in which user interface elements are displayed based on querying smart contract 604 on behalf of the service provider after the service provider has signed smart contract 604 in accordance with an example embodiment. FIG. 9 is an example GUI screen 900 in which user interface elements are displayed based on querying smart contract 604 on behalf of the consumer after the service provider has signed smart contract 604 in accordance with an example embodiment. As shown in FIG. 8, when smart contract 604 is queried on behalf of the service provider, user interfaced elements 704 and 712 are no longer displayed as the conditions for displaying are no longer met (i.e., service provider has signed smart contract 604). Moreover, user interface element 708 has been updated to reflect the amount of funds deposited by the service provider (shown as user interface element 708'). Finally, new user interface element 802 and 804 are displayed. User interface 802 may be a button that enables the service provider to revert the signing and receive his funds back. User interface element 804 provides a text description of the functionality provided by user interface element 802. User interface elements 802 and 804 may be displayed upon a corresponding complementary function associated with a smart contract method for reverting the signing returning a positive result. User interface element 804 may be displayed based on a UX annotation included in the code of smart contract 604 and/or compilation artifacts file 418 that is associated with a smart contract method for reverting the signing of smart contract 604, thereby returning the contract to the previous state where neither party has yet signed smart contract 604.

As shown in FIG. 9, user interface elements 704' and 712 are still displayed for the consumer, as he has yet to sign the contract (i.e., the condition required for not displaying user interface element 712 has not been met). Moreover, user interface element 708 has been updated (shown as user interface element 708') to reflect the amount of funds deposited by the service provider.

Figure 10:
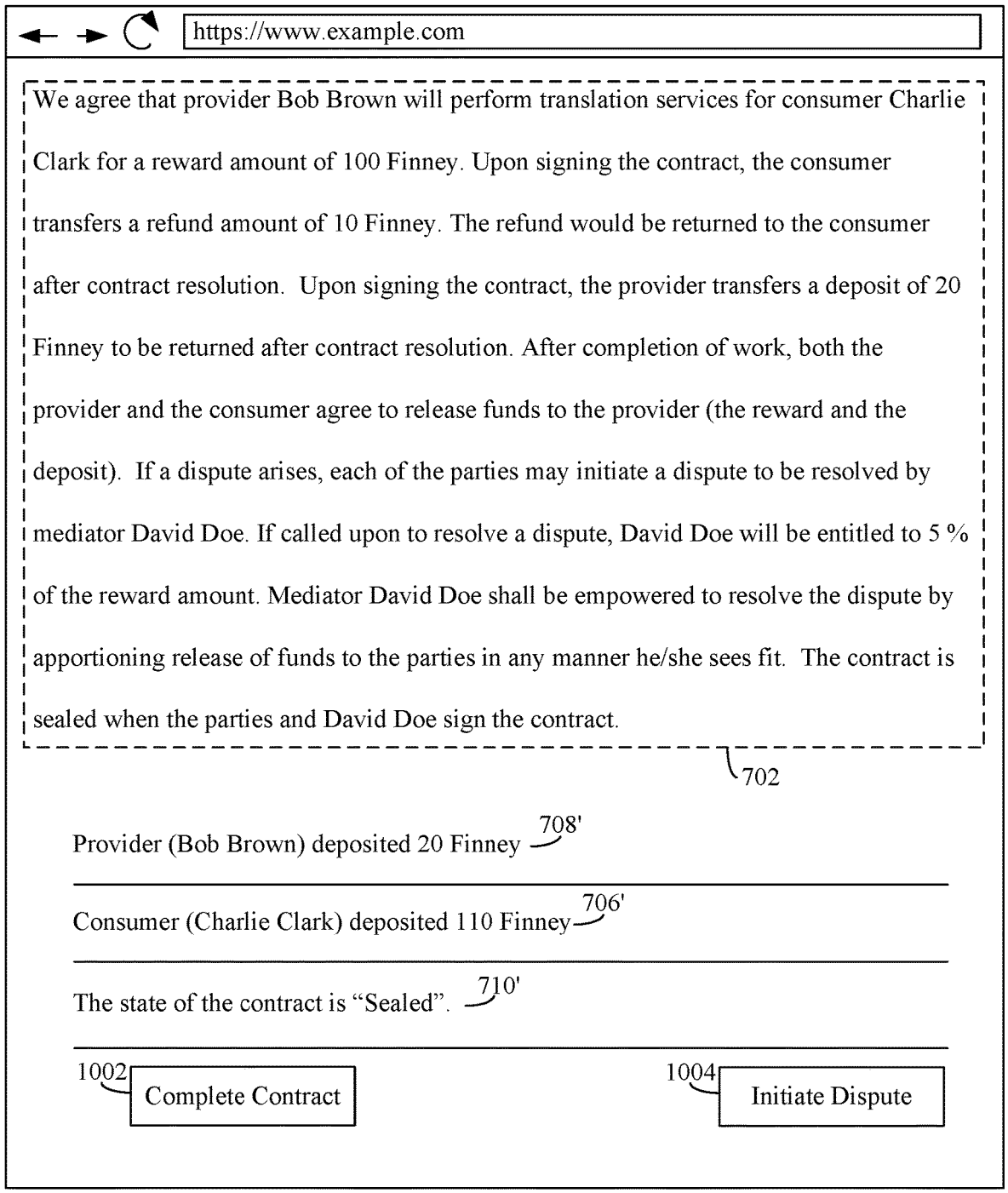
FIG. 10 is an example GUI screen in which user interface elements are displayed to a consumer based on querying a smart contract after all parties have signed the smart contract, in accordance with an example embodiment.

The user interface elements presented to the service provider and consumer (and/or other parties to the smart contract, such as a mediator) continue to change through all the different phases of the smart contract depending on the actions taken by the parties and/or the state in which smart contract 604 is in. For example, FIG. 10 is an example GUI screen 1000 in which user interface elements are displayed based on querying smart contract 604 on behalf of the consumer after the service provider has signed smart contract 604, and after the consumer has signed smart contract 604, in accordance with an example embodiment. As shown in FIG. 10, user interface element 708' is unchanged since the deposit made by the provider is unaffected by the consumer signing smart contract 604. However, GUI screen 1000 now includes user interface element 706' which reflects the total deposit made by the consumer when they signed smart contract 604. Likewise, GUI screen 1000 also includes user interface element 710' which reflects the fact that the contract is now changed to the 'sealed' state (for the purposes of GUI screen 1000, please assume that mediator David Doe has also signed the contract).

GUI screen 1000 also includes new user interface elements 1002 and 1004. User interface element 1002 and 1004 are each, like user interface element 712, buttons that trigger actions. Whereas pressing user interface element 712 will trigger a user's signing smart contract 604, pressing user interface element 1002 shall signal the consumer wishes to complete the contract. Assuming that the service provider has likewise clicked on an analogous 'Complete Contract' user interface element in their GUI, the contract will complete and funds will be released to the service provider per the terms of the contract.

Upon completion of the contract, whether by action of user interface element 1002 as described herein just above or by action of a mediator as described herein below, smart contract 604 may be configured to delete itself from the blockchain. For example, embodiments implemented using the Ethereum blockchain may elect to execute a selfdestruct( ) at the conclusion of smart contract 604. Such a selfdestruct( ) call may be configured to send any remaining fund balance to a specified address which has the benefit of costing less than execution of an address.send( ) invocation. Moreover, such an operation frees up space on the blockchain resulting in lowering of overall fees due at the end of the contract. It should be noted, however, that deletion of the smart contract from the blockchain will thereafter prevent rendering a GUI as described herein since the underlying smart contract state no longer exists. Since the smart contract was terminated, however, the inability to render the state of the contract is generally acceptable.

User interface element 1004, on the other hand, may be used by the consumer to initiate a dispute. Of course, it should be understood that an analogous user interface element is made available to the provider in their GUI (not shown here), and which thereby permits the provider to initiate a dispute. When user interface element 1004 is pressed, the contract will enter the disputed state, and a GUI available to the mediator will be enabled to allow the mediator to take appropriate action.

Figure 11:
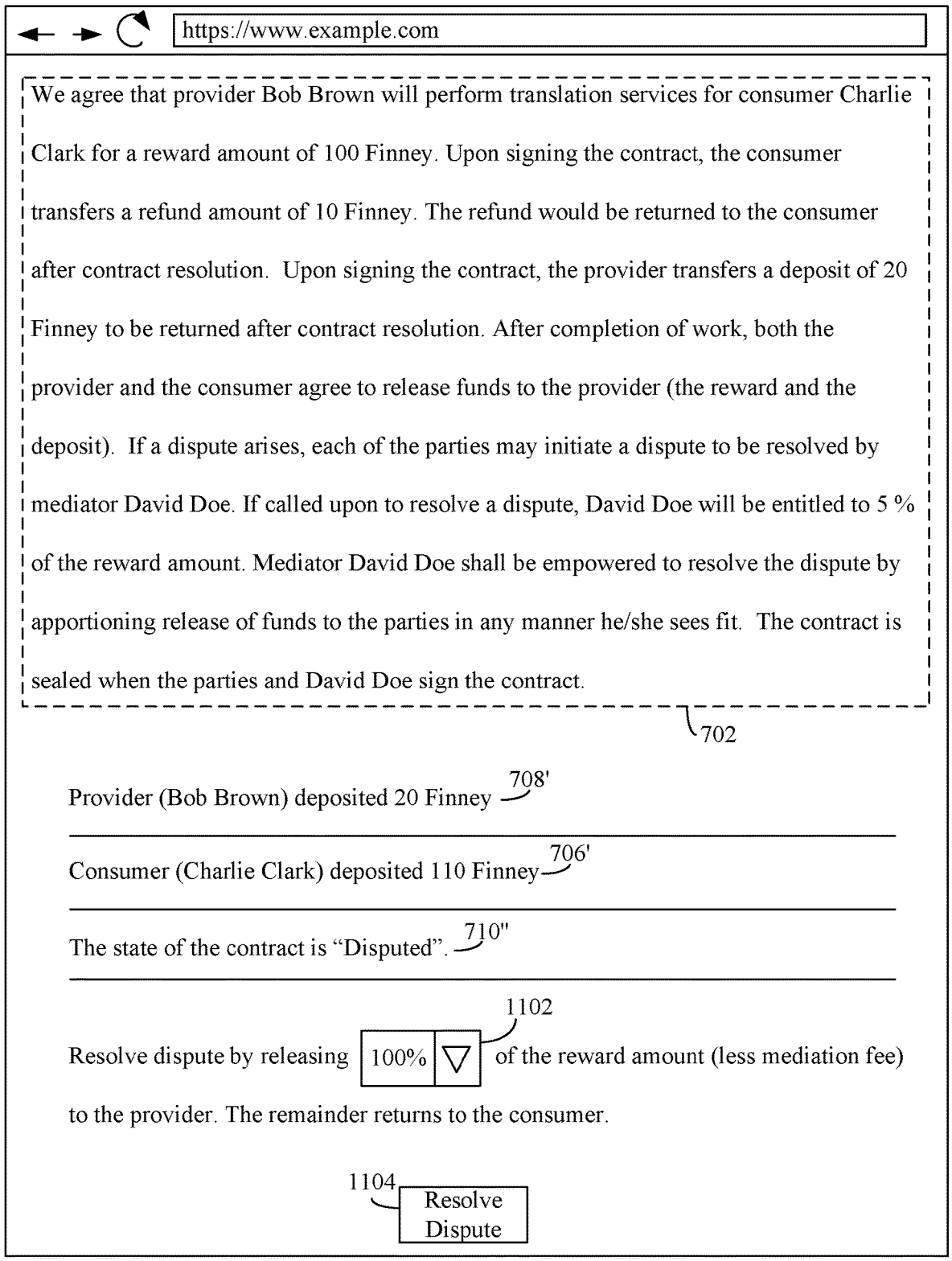
FIG. 11 is an example GUI screen in which user interface elements are displayed to a mediator based on querying a smart contract after a party has initiated a dispute, in accordance with an example embodiment.

For example, FIG. 11 is an example GUI screen 1100 in which user interface elements are displayed based on querying smart contract 604 on behalf of the mediator after either the service provider or consumer has initiated a dispute, in accordance with an example embodiment. The user interface elements of GUI screen 1100 reflect the fact that smart contract 604 is now being disputed by one or both parties. User interface elements 708' and 706' reflect no change from the previous state inasmuch as such funds continue to be on deposit (i.e. escrowed in the smart contract). User interface element 710", on the other hand reflects the fact that the contract has entered the 'disputed' state. Once smart contract 604 enters the disputed state, only the mediator may perform smart contract actions pursuant to the terms of the contract. In practice, the mediator will get in contact with the parties to gather facts and discuss the nature of the dispute. The mediator may thereafter perform whichever of one or more actions that may be enabled in GUI screen 1100 consistent with the terms of the contract.

Thus, in an embodiment, GUI screen 1100 is enabled to provide user interface elements 1102 and 1104. In an embodiment, user interface elements 1102 permits the mediator to select a percentage of the escrowed reward amount (after the mediation fee is deducted) to release to the provider, with the remainder to be returned to the consumer. In alternate embodiments, the mediator may instead by able to select an amount instead of a percentage. Upon satisfactory apportionment of the funds per user interface element 1102, the mediator may click user element 1104 to resolve the dispute and release the funds as specified. Upon invocation of the 'resolve dispute' method associated with user interface element 1104, the smart contract will disburse the specified percentage of the funds to the specified party, and the balance of the funds (if any) to the other party. In embodiments, the disbursement of funds will ordinarily end smart contract 604, and the mediator's fee will likewise be disbursed to him/her. In the running example of smart contract 604 discussed herein, the mediator will be rewarded 5% of the reward amount, or 5 finney.

Note, the actions GUI screen 1100 enables the mediator to undertake are merely exemplary. In other embodiments, example GUI screen 1100 may enable other actions such as rescinding the contract, modifying the contract, or such other actions as may be agreed upon by the parties during negotiation.

UX generator 602A and/or 602B may be configured to provide query(ies) 616A and/or 616B and/or receive event notification 626, positive response 620A and/or 620B and/or negative response 622A and/or 622B via an API that interfaces blockchain network 112 and UX generator 602A and/or 602B. In an embodiment in which blockchain network 112 is an Ethereum-based, the API may be a Metamask API. UX generator 602A and/or 602B may be configured to provide query(ies) 630A and/or 630B to server 634 via a REST API.

Figure 12:
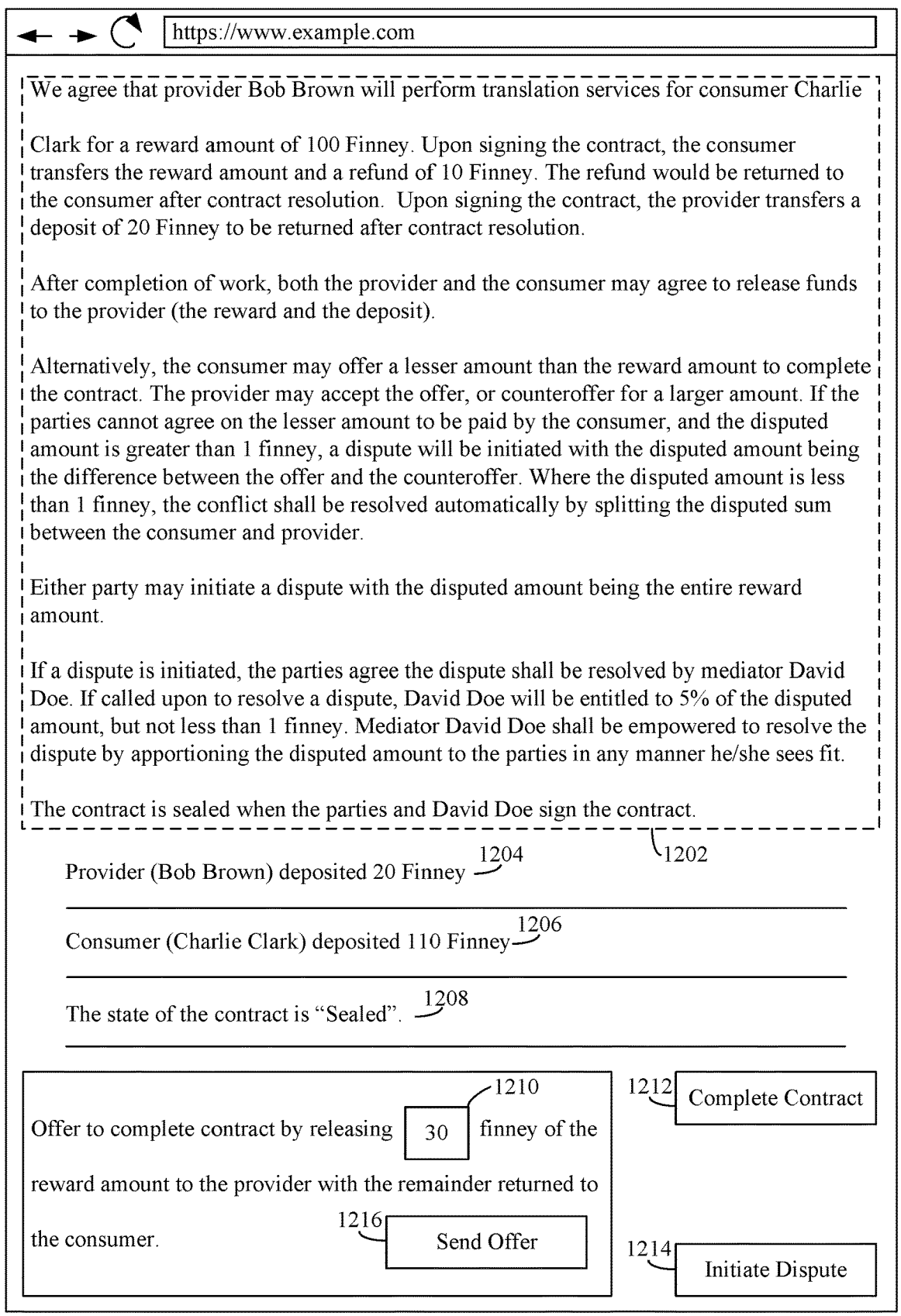
FIG. 12 is an example GUI screen in which user interface elements are displayed to a consumer based upon querying an alternative smart contract, in accordance with an example embodiment.

The above described example smart contract 604, and associated GUI screens 7A-7B and 8-11, is but one relatively simple smart contract example. In principle, smart contracts (and associated GUI screens) may by arbitrarily complex and reflect any scenario capable of being coded on the underlying smart contract platform. For example, FIG. 12 depicts an example GUI screen 1200 in which user interface elements are displayed to a consumer based upon querying an alternative smart contract, in an embodiment. GUI screen 1200 includes smart contract text 1202 that represents an immutable version of an alternative version of smart contract 604. GUI screen 1200 also includes various interface elements 1204, 1206, 1208, 1210, 1212, 1214 and 1216 that are displayed based on querying smart contract 604 on behalf of the consumer, Charlie Clark, in the manner described above.

Smart contract text 1202 reflects a more complex smart contract 604 that enables the parties to negotiate and agree to alternative payment terms after the contract has been sealed, and without requiring the involvement of, or payment to, a mediator. The smart contract embodied by smart contract text 1202 reduces the chance that a mediator will be required since it offers the parties the chance to resolve a conflict amongst themselves. Such a smart contract may be beneficial since on average, mediation costs are lowered. Example GUI 1200 may best be understood in terms of an example scenario.

Suppose that the consumer, Charlie Clark, is not pleased with the work provided by Bob Brown and refuses to pay full and previously agreed upon sum of 100 finney. GUI screen 1200 depicts the smart contract 604 as seen by Charlie Clark. Guid screen 1200 includes user interface elements 1204, 1206 and 1208 which are analogous to those described above in conjunction with FIGS. 7A-7B and 8-11. In particular, user interface elements 1204 and 1206 indicate the amount of funds deposited by each party. User interface element 1208 indicates that all parties have signed the contract since the contract is in the 'sealed' state.

Thus, GUI screen 1200 of FIG. 10 is analogous that GUI screen 1000 of FIG. 10, except that the underlying smart contract associated with each is different. Recall that GUI screen 1000 exposed only two smart contract actions to the consumer after the contract was sealed: complete the contract via user interface element 1002, or initiate a dispute via user interface element 1004. GUI screen 1200 of FIG. 12 enables the consumer to perform these same actions via user interface elements 1212 and 1214, respectively. GUI screen 1200 differs, however, in that the consumer is enabled to offer a lesser amount to the consumer in order to complete the contract. In particular GUI screen 1200 includes user interface elements 1210 and 1216. User interface element 1210 comprises a text entry box that permits the consumer to enter the proposed settlement amount to thereafter be sent to the provider by pressing the user interface element 1216.

In the previous example discussed above, the consumer could only dispute the entire contract, thereby committing to paying a mediator 5% of the entire amount. In this example, however, instead of initiating the dispute as previously described, this contract allows parties to revise their agreement after the work done. Suppose, for example, that consumer Charlie believes that the work provided by Bob Brown was incomplete or low quality. In that instance, Charlie may propose, for example, to pay Bob 30 finney by entering such in user interface element 1210 and clicking on user interface element 1216.

Once Charlie sends his settlement offer, a notification may be generated and sent to Bob as described above, and wherein Bob's GUI screen (not shown) may be updated to reflect the new state of the contract and enable Bob additional actions to be performed consistent with the above described embodiments. For example, an analogous GUI screen rendered for Bob may enable him to accept the offered settlement, to enter and send a counteroffer, or to initiate a dispute of the full contract amount. Continuing with our example, suppose that although amenable to compromise, Bob feels that 30 finney is too low a settlement amount, and instead proposes that the appropriate amount is 70 finney. Bob may enter that amount in his GUI (not shown) and transmit the counteroffer to Charlie for consideration.

In the event that Charlie agrees with the counteroffer (or Bob agrees with Charlies initial offer), the parties may end the contract on the revised terms without involving a mediator or paying a fee. However, if a disagreement still exists, the mediator may be called upon to resolve the remaining dispute. In this example, Charlie has offered 30 finney and Bob is asking for 70 finney, thus bringing the amount in dispute to the difference, 40 finney. Here, David Doe will be enabled via his GUI (e.g., a GUI analogous to that shown in FIG. 11 but also not shown herein) to determine an appropriate amount based on the facts and his judgment, and resolve the dispute accordingly. This type of smart contract structure may be beneficial since even where there is a dispute, the mediator is paid his percentage on a lower disputed amount (in this example, 5% of the 40 finney dispute amount, or 2 finney) instead of the value of the entire reward amount (i.e., where David Doe would instead be owed 5 finney).

It is noted that while the embodiments described above describe that users may negotiate and generate a smart contract via manual selection of an appropriate smart contract template, the embodiments described herein are not so limited. For instance, in an embodiment, the language and/or terms of the smart contract may be generated based on information obtained from a communication session between a plurality of different users. For instance, users may engage in a chat session via a website (e.g., a social media-based website, such as, but not limited to, Facebook, LinkedIn, etc.). UI generator 610 (as described above with reference to FIG. 6) may be configured to analyze the communication session between the users (e.g., using machine learning techniques) and generate the language and/or terms based on the context of the messages communicated between the users. Such analysis of the communication session may be performed with various types of natural language processing.

Figure 13:
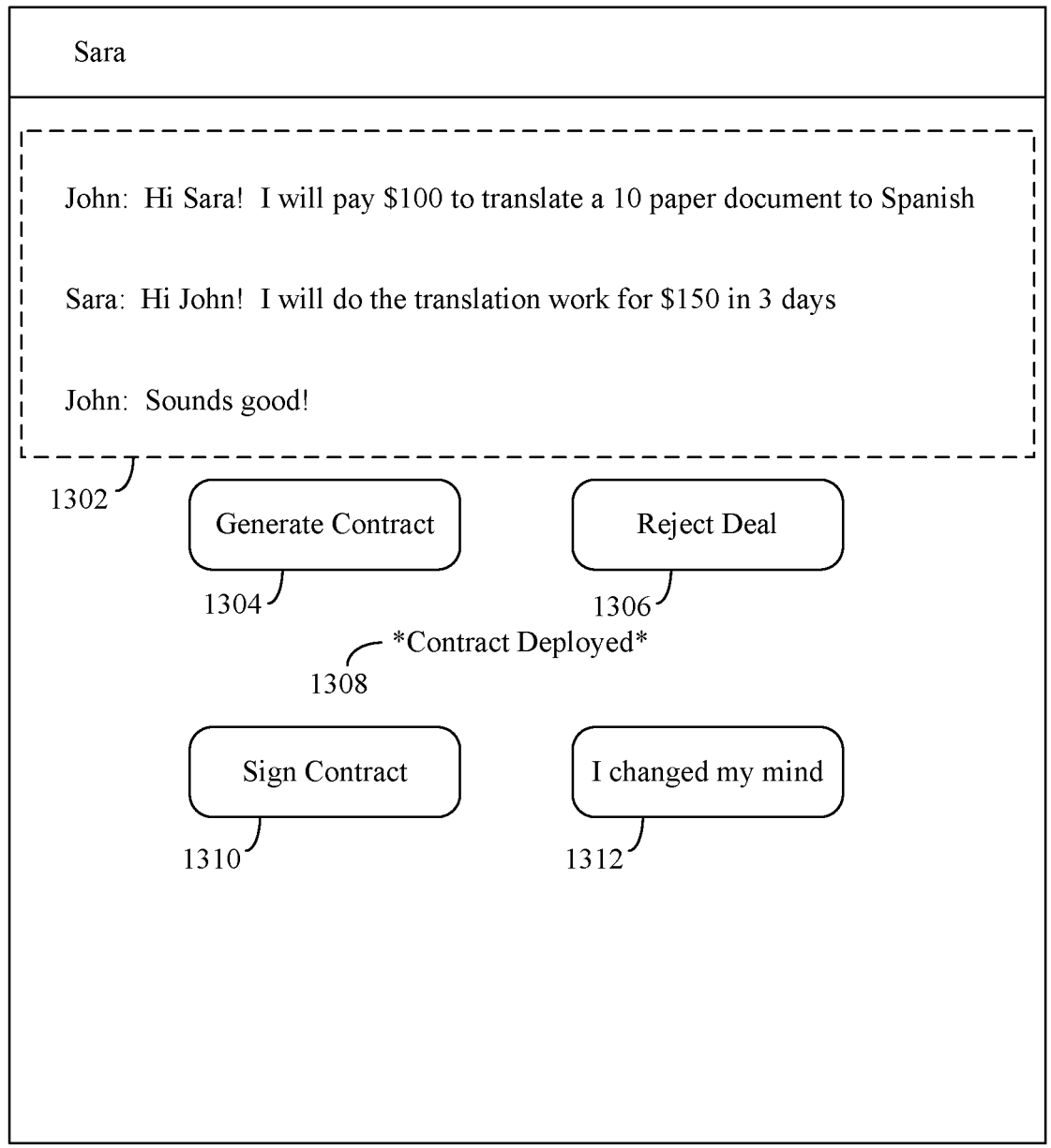
FIG. 13 is an example GUI screen that depicts a conversation between two users, in accordance with an example embodiment.

For instance, FIG. 13 is an example GUI screen 1300 that depicts a conversation 1302 between two users in accordance with an example embodiment. As shown in FIG. 13, conversation 1302 is with regards to establishing a work agreement between John and Sara; in particular, a work agreement for translating a document into Spanish. UI generator 610 may be configured to analyze the messages and determine that John and Sara are negotiating a contract and determine the terms of the contract. The terms determined in this example would be the service provider ("Sara"), the consumer ("John"), the amount to be paid for the work by the consumer ("$150"), and a description of the work (e.g., document translation to Spanish).

After determining the terms of the contract, UI generator 610 may cause user interface elements to be rendered in the chat window utilized by each of John and Sara that may be interacted with to generate the smart contract or to reject the agreement therebetween. For instance, as shown in FIG. 13, UI generator 610 causes user interface elements 1304 and 1306 to be rendered. User interface element 1304, when activated by the user, causes the smart contract to be generated. User interface element 1306, when activated by the user, enables the user to reject the agreement, and therefore, not causing the smart contract to be generated.

Upon each of John and Sara activating their respective user interface element 1304 indicating their willingness to have a smart contract generated, UI generator 610 may generate a smart contract based on the above-determined information, or alternatively, determine a smart contract template from which the smart contract will be based. In the latter situation, the above-determined information may be used to populate variables of the smart contract template during compilation of the smart contract in a manner as described above with reference to FIGS. 3 and 4.

After generating and compiling the smart contract, the smart contract may be deployed to blockchain network 112 as described above with reference to FIGS. 3 and 4. Thereafter, UI representation determination engine 602 may query the smart contract (e.g., smart contract 604) to determine which actions each of John and Sara are allowed to perform with respect to smart contract 604 in a similar manner as described above with reference to FIGS. 6-12. For example, with reference to FIG. 13, UI representation determination engine 602 outputs a text string 1308 (which e.g., may be determined via UX annotations included in smart contract 604) and user interface elements 1310 and 1312 (which e.g., may be determined based on particular complementary functions returning positive indications 622). Text string 1308 indicates the state of smart contract 604, user interface element 1310 enables the user (i.e., John or Sara) to sign smart contract 604, and user interface element 1312 enables the user to reject smart contract 604. The user interface elements displayed to a particular user may differ based on the identity of the user and/or the state in which smart contract 604 is in, as described above with reference to FIGS. 6-12.

FIG. 14 shows a flowchart 1400 of a method for a method for generating a smart contract, according to an embodiment. In an embodiment, flowchart 1400 may be implemented by systems 100 and/or 600 shown in FIGS. 1 and 6, respectively, although the method is not limited to those implementations. Accordingly, flowchart 1400 will be described with continued reference to FIGS. 1 and 6. Other structural and operational embodiments will be apparent to persons skilled in the relevant art(s) based on the discussion regarding flowchart 1400 and systems 100 and 600 of FIGS. 1 and 6.

Flowchart 1400 begins with step 1402. In step 1402, a selection of a smart contract template from a first party or a second party is accepted, the first and second party engaging in a transaction and determining the selected smart contract template based at least in part on transaction terms negotiated between the first and second party. For example with reference to FIG. 1, and as discussed above, UI generator 110 may be configured to transmit GUI information 140A and/or 140B to each of browser 136A and browser 136B, respectively, where such GUI information may enable a user to select a smart contract template from among those stored in smart contract template library 118. In an embodiment, GUI 116A and/or GUI 116B may enable users to browse the smart contract template library 118 for a suitable smart contract template that most closely matches the negotiated transaction. UI generator 110 may thereafter accept selection from one or both users of one of the smart contract templates from the smart contract template library 118. Flowchart 1400 continues at step 1404.

At step 1404, a selected mediator is accepted from the first and second party, the selected mediator being jointly chosen by the first and second party. For example, with reference to FIGS. 1, 2 and 6, the selected contract template may be rendered via GUI 116A and/or GUI 116B by UI generator 110 to provide information 140A and 140B to GUI 116A and GUI 116B, respectively. The rendered UI may be displayed via GUI 116A and/or GUI 116B as human-readable text, and the variables may be displayed as user-interactive elements (e.g., text boxes, pull-down menus, etc.) that enable the users to specify user-specifiable terms of the smart contract. For example, user interface element 218 of FIG. 2 enables a user to specify a mediator in a number of ways as discussed above, which is thereafter accepted by, for example, system 100 or 600 of FIG. 1 or 6, respectively.

At step 1406, a smart contract is generated based at least in part on the selected smart contract template and including smart contract terms based at least in part on the transaction terms, the smart contract terms including designation of the selected mediator for resolution of disputes arising under the smart contract, the smart contract enabling one or more smart contract actions to be invoked by one or more of the first party, the second party and the selected mediator. With continued reference to systems 100 and 600 of FIGS. 1 and 6, respectively, embodiments may be configured to generate smart contract 604 based on the selected mediator and negotiated transaction terms. For example, parties may be presented with the smart contract template selected at step 1404 (an example of which is depicted as smart contract template 202 in FIG. 2) in their respective GUI (i.e., GUI 116A, GUI 116B, etc.). The parties are thereafter enabled to specify the user-specifiable terms of the smart contract, whereby the terms of the resulting smart contract enable one or more actions to be performed by the parties as discussed above with respect to the example GUIs depicted in FIGS. 7A, 7B and 8-12.

At step 1408, the smart contract in instantiated in conjunction with a distributed ledger. For example, and with continued reference to systems 100 and 600 of FIGS. 1 and 6, respectively, embodiments are enabled to deploy the smart contract to, for example, a blockchain after the smart contract template is completed. More specifically, flowchart 300 of FIG. 3 described a method for deploying the smart contract to a blockchain, according to an embodiment.

Flowchart 1400 continues at step 1410. At step 1410, the smart contract is presented to the first and second party. With continued reference to systems 100 and 600 of FIGS. 1 and 6, respectively, the smart contract generated at step 1406 may be presented to the user as shown in, for example, FIG. 7A. FIG. 7a shows the now immutable terms 702 of the smart contract, the state 710 of the smart contract, and enables the user to perform a contract action 712 (i.e. sign the contract).

Flowchart 1400 concludes at step 1412. At step 1412, acceptance of the smart contract by the first and second party is received. For example, and with continued reference to FIGS. 1, 6, 7A, 7B and 8-12, smart contract 702 as depicted in FIG. 7A enables the user to accept the terms of the contract by signing the contract (i.e., pressing the button comprised by user interface element 712).

Figure 15:
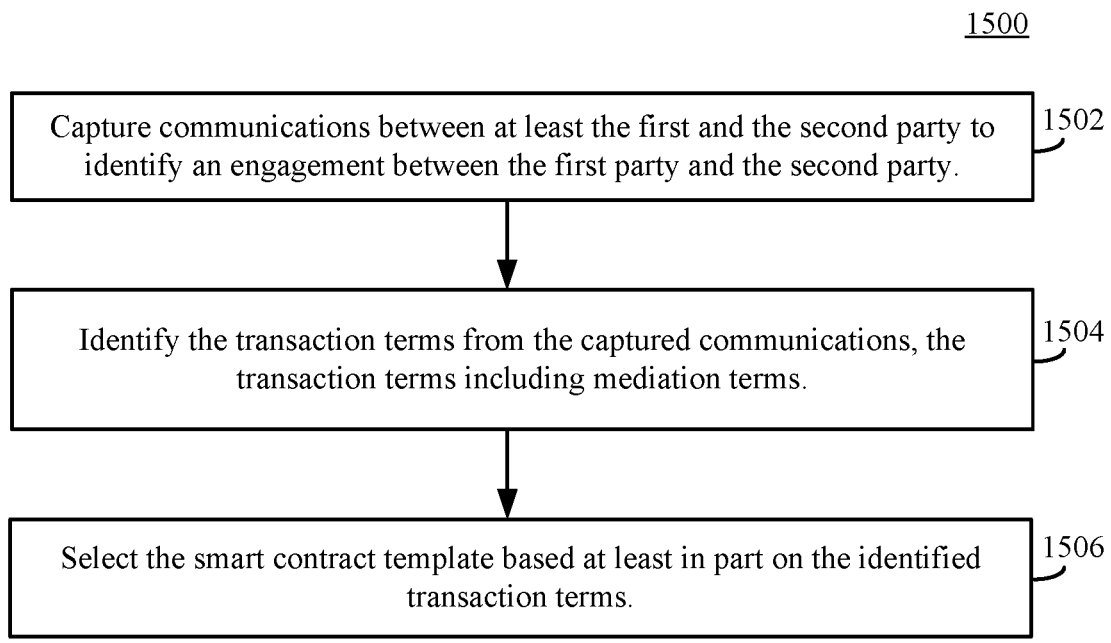
FIG. 15 shows a flowchart of a method for selecting a smart contract template for generating a smart contract, in accordance with an example embodiment.

FIG. 15 shows a flowchart 1500 of a method for selecting a smart contract template for generating a smart contract, in accordance with an example embodiment. In an embodiment, flowchart 1500 may be implemented by systems 100 and/or 600 as shown in FIGS. 1 and 6, although the method is not limited to those implementations. Accordingly, flowchart 1500 will be described with continued reference to FIGS. 1 and 6. Other structural and operational embodiments will be apparent to persons skilled in the relevant art(s) based on the discussion regarding flowchart 1500 and systems 100 and 600 of FIGS. 1 and 6, respectively.

Flowchart 1500 begins with step 1502. In step 1502, communications between at least the first and the second party are captured to identify an engagement between the first party and the second party. For example, and as discussed above, embodiments of system 600 may be enabled to parse conversation 1302 of FIG. 13 using natural language processing techniques to determine that the parties are attempting to initiate a business engagement.

At step 1504, the transaction terms are identified from the captured communications, the transaction terms including mediation terms. For example, and as discussed above in particularly in conjunction with FIGS. 7A, 7B and 8-12, the parties may elect to hire and specify a mediator to resolve any contract disputes between the parties. Although not depicted in FIG. 13, conversation 1302 may also include discussion of whether to include a mediator in the engagement and if so, which mediator should be used.

Flowchart 1500 concludes at step 1506. In step 1506, the smart contract template is selected based at least in part on the identified transaction terms. As discussed above, natural language processing functions may be applied to, for example, conversation 1302 to determine what terms must be included in the deployed smart contract. After identification of the terms, embodiments may be enabled to search smart contract template library for a smart contract template that most closely matches the requirements of the identified smart contract terms as negotiated by the parties.

III. Example Mobile Device Implementation

Figure 16:
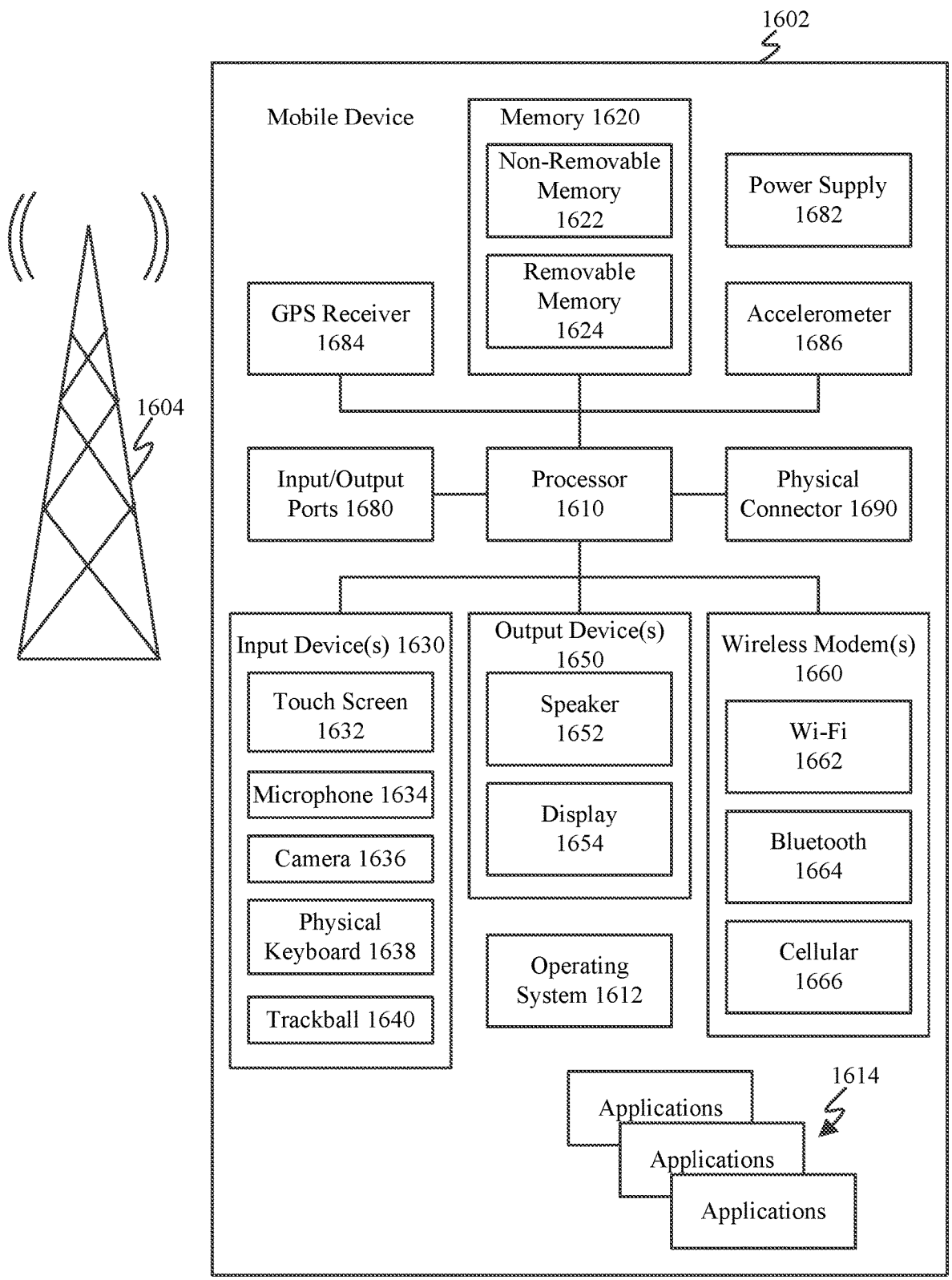
FIG. 16 is a block diagram of an exemplary mobile device that may implement embodiments described herein.

FIG. 16 is a block diagram of an exemplary mobile device 1602 that may implement embodiments described herein. For example, mobile device 1602 may be used to implement server 134, computing device 102A, computing device 102B, smart contract generator 106, UI generator 110, smart contract template library 118, GUI 116A, browser 136A, browser window 114A, display screen 108A, GUI 116B, browser 136B, browser window 114B, and display screen 108B of FIG. 1, server 434, smart contract generator 406, UI generator 410, variable replacer 402, compiler 404, and deployer 408 of FIG. 4, server 634, smart contract generator 606, UX generator 602, and user profiles 608 of FIG. 6, and/or any of the components respectively described therein and/or any of the steps of any of the flowcharts of FIGS. 3, 14, and 15. As shown in FIG. 16, mobile device 1602 includes a variety of optional hardware and software components. Any component in mobile device 1602 can communicate with any other component, although not all connections are shown for ease of illustration. Mobile device 1602 can be any of a variety of computing devices (e.g., cell phone, smart phone, handheld computer, Personal Digital Assistant (PDA), etc.) and can allow wireless two-way communications with one or more mobile communications networks 1604, such as a cellular or satellite network, or with a local area or wide area network. Mobile device 1602 can also be any of a variety of wearable computing device (e.g., a smart watch, an augmented reality headset, etc.).

Mobile device 1602 can include a controller or processor 1610 (e.g., signal processor, microprocessor, ASIC, or other control and processing logic circuitry) for performing such tasks as signal coding, data processing, input/output processing, power control, and/or other functions. An operating system 1612 can control the allocation and usage of the components of mobile device 1602 and provide support for one or more application programs 1614 (also referred to as "applications" or "apps"). Application programs 1614 may include common mobile computing applications (e.g., e-mail applications, calendars, contact managers, web browsers, messaging applications) and any other computing applications (e.g., word processing applications, mapping applications, media player applications).

Mobile device 1602 can include memory 1620. Memory 1620 can include non-removable memory 1622 and/or removable memory 1624. Non-removable memory 1622 can include RAM, ROM, flash memory, a hard disk, or other well-known memory devices or technologies. Removable memory 1624 can include flash memory or a Subscriber Identity Module (SIM) card, which is well known in GSM communication systems, or other well-known memory devices or technologies, such as "smart cards." Memory 1620 can be used for storing data and/or code for running operating system 1612 and application programs 1614. Example data can include web pages, text, images, sound files, video data, or other data to be sent to and/or received from one or more network servers or other devices via one or more wired or wireless networks. Memory 1620 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1602 can support one or more input devices 1630, such as a touch screen 1632, a microphone 1634, a camera 1636, a physical keyboard 1638 and/or a trackball 1640 and one or more output devices 1650, such as a speaker 1652 and a display 1654. Other possible output devices (not shown) can include piezoelectric or other haptic output devices. Some devices can serve more than one input/output function. For example, touch screen 1632 and display 1654 can be combined in a single input/output device. Input devices 1630 can include a Natural User Interface (NUI).

Wireless modem(s) 1660 can be coupled to antenna(s) (not shown) and can support two-way communications between processor 1610 and external devices, as is well understood in the art. Modem(s) 1660 are shown generically and can include a cellular modem 1666 for communicating with the mobile communication network 1604 and/or other radio-based modems (e.g., Bluetooth 1664 and/or Wi-Fi 1662). At least one of wireless modem(s) 1660 is typically configured for communication with one or more cellular networks, such as a GSM network for data and voice communications within a single cellular network, between cellular networks, or between the mobile device and a public switched telephone network (PSTN).

Mobile device 1602 can further include at least one input/output port 1680, a power supply 1682, a satellite navigation system receiver 1684, such as a Global Positioning System (GPS) receiver, an accelerometer 1686, and/or a physical connector 1690, which can be a USB port, IEEE 1394 (FireWire) port, and/or RS-232 port. The illustrated components of mobile device 1602 are not required or all-inclusive, as any components can be deleted and other components can be added as would be recognized by one skilled in the art.

In an embodiment, mobile device 1602 is configured to implement any of the above-described features of server 134, computing device 102A, computing device 102B, smart contract generator 106, UI generator 110, smart contract template library 118, GUI 116A, browser 136A, browser window 114A, display screen 108A, GUI 116B, browser 136B, browser window 114B, and display screen 108B of FIG. 1, server 434, smart contract generator 406, UI generator 410, variable replacer 402, compiler 404, and deployer 408 of FIG. 4, server 634, smart contract generator 606, UX generator 602, and user profiles 608 of FIG. 6, and/or any of the components respectively described therein and/or any of the steps of any of the flowcharts of FIGS. 3, 14, and 15. Computer program logic for performing the functions of these devices may be stored in memory 1620 and executed by processor 1610.

IV. Example Computer System Implementation

Figure 17:
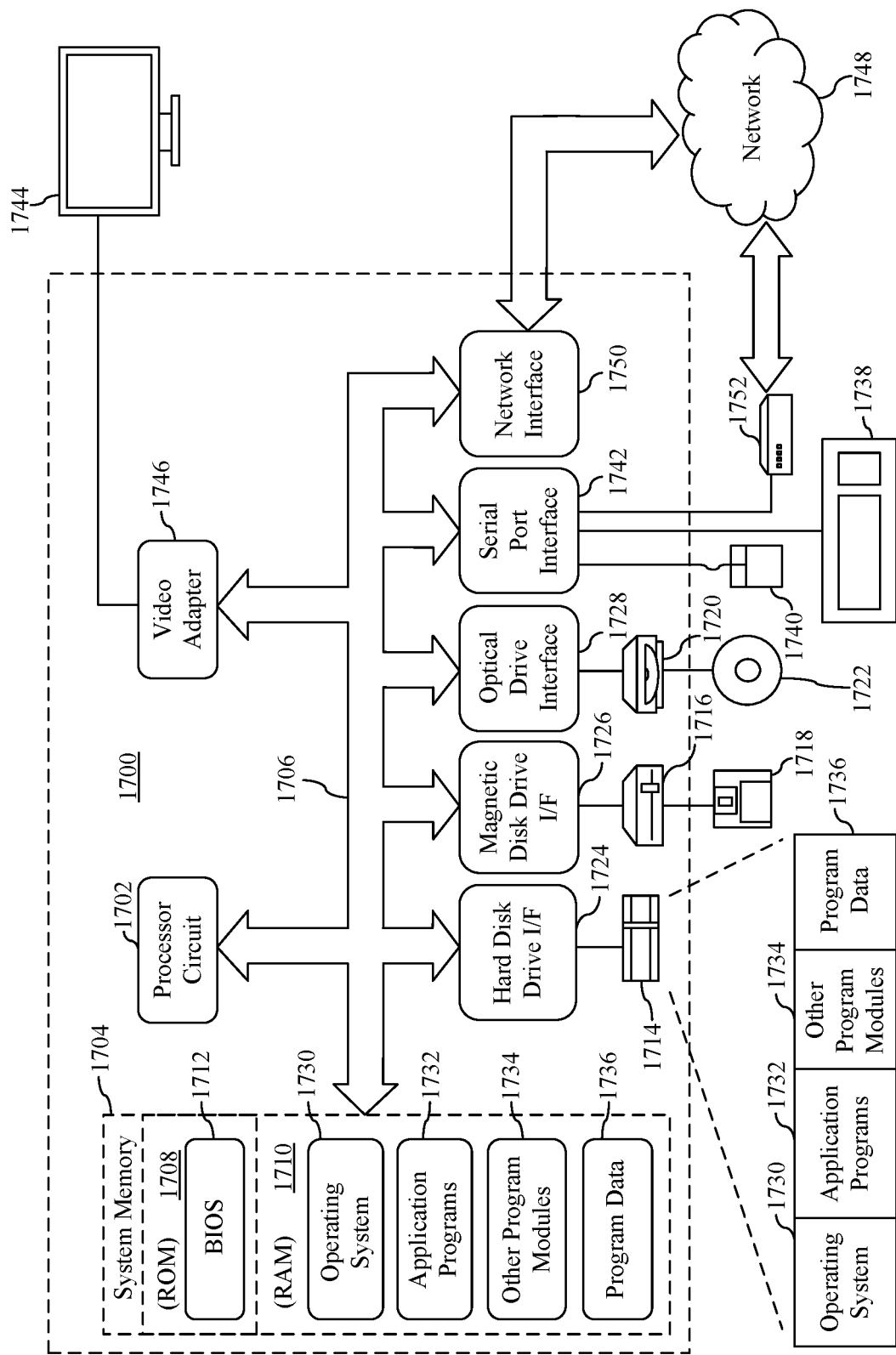
FIG. 17 is a block diagram of an example processor-based computer system that may be used to implement various embodiments.

FIG. 17 depicts an example processor-based computer system 1700 that may be used to implement various embodiments described herein. For example, system 1700 may be used to implement server 134, computing device 102A, computing device 102B, blockchain network 112, smart contract generator 106, UI generator 110, smart contract template library 118, GUI 116A, browser 136A, browser window 114A, display screen 108A, GUI 116B, browser 136B, browser window 114B, and display screen 108B of FIG. 1, server 434, smart contract generator 406, UI generator 410, variable replacer 402, compiler 404, and deployer 408 of FIG. 4, server 634, smart contract generator 606, UX generator 602, and user profiles 608 of FIG. 6, and/or any of the components respectively described therein. System 1700 may also be used to implement any of the steps of any of the flowcharts of FIGS. 3, 14, and 15, as described above. The description of system 1700 provided herein is provided for purposes of illustration, and is not intended to be limiting. Embodiments may be implemented in further types of computer systems, as would be known to persons skilled in the relevant art(s).

As shown in FIG. 17, system 1700 includes a processing unit 1702, a system memory 1704, and a bus 1706 that couples various system components including system memory 1704 to processing unit 1702. Processing unit 1702 may comprise one or more circuits, microprocessors or microprocessor cores. Bus 1706 represents one or more of any of several types of bus structures, including a memory bus or memory controller, a peripheral bus, an accelerated graphics port, and a processor or local bus using any of a variety of bus architectures. System memory 1704 includes read only memory (ROM) 1708 and random access memory (RAM) 1710. A basic input/output system 1712 (BIOS) is stored in ROM 1708.

System 1700 also has one or more of the following drives: a hard disk drive 1714 for reading from and writing to a hard disk, a magnetic disk drive 1716 for reading from or writing to a removable magnetic disk 1718, and an optical disk drive 1720 for reading from or writing to a removable optical disk 1722 such as a CD ROM, DVD ROM, BLU-RAY™ disk or other optical media. Hard disk drive 1714, magnetic disk drive 1716, and optical disk drive 1720 are connected to bus 1706 by a hard disk drive interface 1724, a magnetic disk drive interface 1726, and an optical drive interface 1728, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1730, one or more application programs 1732, other program modules 1734, and program data 1736. In accordance with various embodiments, the program modules may include computer program logic that is executable by processing unit 1702 to perform any or all of the functions and features of server 134, computing device 102A, computing device 102B, blockchain network 112, smart contract generator 106, UI generator 110, smart contract template library 118, GUI 116A, browser 136A, browser window 114A, display screen 108A, GUI 116B, browser 136B, browser window 114B, and display screen 108B of FIG. 1, server 434, smart contract generator 406, UI generator 410, variable replacer 402, compiler 404, and deployer 408 of FIG. 4, server 634, smart contract generator 606, UX generator 602, and user profiles 608 of FIG. 6, and/or any of the components respectively described therein, and/or any of the steps of any of the flowcharts of FIGS. 3, 14, and 15, as described above. The program modules may also include computer program logic that, when executed by processing unit 1702, causes processing unit 1702 to perform any of the steps of any of the flowcharts of FIGS. 3, 14, and 15, as described above.

A user may enter commands and information into system 1700 through input devices such as a keyboard 1738 and a pointing device 1740 (e.g., a mouse). Other input devices (not shown) may include a microphone, joystick, game controller, scanner, or the like. In one embodiment, a touch screen is provided in conjunction with a display 1744 to allow a user to provide user input via the application of a touch (as by a finger or stylus for example) to one or more points on the touch screen. These and other input devices are often connected to processing unit 1702 through a serial port interface 1742 that is coupled to bus 1706, but may be connected by other interfaces, such as a parallel port, game port, or a universal serial bus (USB). Such interfaces may be wired or wireless interfaces.

Display 1744 is connected to bus 1706 via an interface, such as a video adapter 1746. In addition to display 1744, system 1700 may include other peripheral output devices (not shown) such as speakers and printers.

System 1700 is connected to a network 1748 (e.g., a local area network or wide area network such as the Internet) through a network interface 1750, a modem 1752, or other suitable means for establishing communications over the network. Modem 1752, which may be internal or external, is connected to bus 1706 via serial port interface 1742.

As used herein, the terms "computer program medium," "computer-readable medium," and "computer-readable storage medium" are used to generally refer to memory devices or storage structures such as the hard disk associated with hard disk drive 1714, removable magnetic disk 1718, removable optical disk 1722, as well as other memory devices or storage structures such as flash memory cards, digital video disks, random access memories (RAMs), read only memories (ROM), and the like. Such computer-readable storage media are distinguished from and non-overlapping with communication media (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1732 and other program modules 1734) may be stored on the hard disk, magnetic disk, optical disk, ROM, or RAM. Such computer programs may also be received via network interface 1750, serial port interface 1742, or any other interface type. Such computer programs, when executed or loaded by an application, enable system 1700 to implement features of embodiments discussed herein. Accordingly, such computer programs represent controllers of the system 1700. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1700 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Further Example Embodiments

A computer-implemented method is described herein. The method includes: accepting a selection of a smart contract template from a first party or a second party, the first and second party engaging in a transaction and determining the selected smart contract template based at least in part on transaction terms negotiated between the first and second party; accepting a selected mediator from the first and second party, the selected mediator being jointly chosen by the first and second party; generating a smart contract based at least in part on the selected smart contract template and including smart contract terms based at least in part on the transaction terms, the smart contract terms including designation of the selected mediator for resolution of disputes arising under the smart contract, the smart contract enabling one or more smart contract actions to be invoked by one or more of the first party, the second party and the selected mediator; instantiating the smart contract in conjunction with a distributed ledger; causing the smart contract to be presented to the first and second party; and receiving acceptance of the smart contract by the first and second party.

Another implementation of the foregoing method comprises enforcing the smart contract, the enforcing the smart contract comprising: enabling the first party and the second party to initiate a dispute process, wherein the dispute process enables the selected mediator to invoke one or more of the one or more smart contract actions, the invocation reflecting a resolution determined by the selected mediator.

In another implementation of the foregoing method, enforcing the smart contract further comprises: transmitting to the mediator at least a portion of escrowed cryptocurrency held in escrow pursuant to the terms of the smart contract, the transmitting commencing upon invocation by the selected mediator of at least one of the one or more smart contract actions.

In another implementation of the foregoing method, the one or more smart contract actions enable the mediator to perform one or more of the following actions: rescind the contract; release some or all the escrowed cryptocurrency to the first party; release some or all of the escrowed cryptocurrency to the second party; or actions agreed upon by the first party and the second party prior to formation of the smart contract.

In another implementation of the foregoing method, the selected mediator is chosen via a social network including a plurality of mediators.

In another implementation of the foregoing method, the method further comprises
capturing communications between at least the first and the second party to identify an engagement between the first party and the second party; identifying the transaction terms from the captured communications, the transaction terms including mediation terms; and causing the smart contract template to be presented to the first party and/or the second party based at least in part on the identified transaction terms.

In another implementation of the foregoing method, the first party and the second party engage via a social network, and the captured communications comprise one or more of: social network based communications, instant messages, text messages or email messages.

A smart contract generation system is described herein. The system includes: one or more processors and one or more memory devices connected thereto, the one or more memory devices storing computer program logic for execution by the one or more processors, the computer program logic configured to: accept a selection of a smart contract template from a first party or a second party, the first and second party engaging in a transaction and determining the selected smart contract template based at least in part on transaction terms negotiated between the first and second party; accept a selected mediator from the first and second party, the selected mediator being jointly chosen by the first and second party; generate a smart contract based at least in part on the selected smart contract template and including smart contract terms based at least in part on the transaction terms, the smart contract terms including designation of the selected mediator for resolution of disputes arising under the smart contract, the smart contract enabling one or more smart contract actions to be invoked by one or more of the first party, the second party and the selected mediator; instantiate the smart contract in conjunction with a distributed ledger; cause the smart contract to be presented to the first and second party; and receive acceptance of the smart contract by the first and second party.

In one implementation of the foregoing system, the computer program logic is further configured to enforce the smart contract by enabling the first party and the second party to initiate a dispute process, wherein the dispute process enables the selected mediator to invoke one or more of the one or more smart contract actions, the invocation reflecting a resolution determined by the selected mediator.

In one implementation of the foregoing system, the computer program logic is further configured to transmit to the mediator at least a portion of escrowed cryptocurrency held in escrow pursuant to the terms of the smart contract, the transmitting commencing upon invocation by the selected mediator of at least one of the one or more smart contract actions.

In one implementation of the foregoing system, the one or more smart contract actions enable the mediator to perform one or more of the following actions: rescind the contract; release some or all the escrowed cryptocurrency to the first party; release some or all of the escrowed cryptocurrency to the second party; or actions agreed upon by the first party and the second party prior to formation of the smart contract.

In one implementation of the foregoing system, the selected mediator is chosen via a social network including a plurality of mediators.

In one implementation of the foregoing system, the computer program logic is further configured to: capture communications between at least the first and the second party to identify an engagement between the first party and the second party; identify the transaction terms from the captured communications, the transaction terms including mediation terms; and cause the smart contract template to be presented to the first party and/or the second party based at least in part on the identified transaction terms.

In one implementation of the foregoing system, the first party and the second party engage via a social network, and the captured communications comprise one or more of: social network based communications, instant messages, text messages or email messages.

A computer-readable storage medium having program instructions recorded thereon that, when executed by at least one processor, perform a method is disclosed herein. The method includes: accepting a selection of a smart contract template from a first party or a second party, the first and second party engaging in a transaction and determining the selected smart contract template based at least in part on transaction terms negotiated between the first and second party; accepting a selected mediator from the first and second party, the selected mediator being jointly chosen by the first and second party; generating a smart contract based at least in part on the selected smart contract template and including smart contract terms based at least in part on the transaction terms, the smart contract terms including designation of the selected mediator for resolution of disputes arising under the smart contract, the smart contract enabling one or more smart contract actions to be invoked by one or more of the first party, the second party and the selected mediator; instantiating the smart contract in conjunction with a distributed ledger; causing the smart contract to be presented to the first and second party; and receiving acceptance of the smart contract by the first and second party.

In another implementation of the foregoing computer-readable storage medium, the method further comprises enforcing the smart contract, the enforcing the smart contract comprising: enabling the first party and the second party to initiate a dispute process, wherein the dispute process enables the selected mediator to invoke one or more of the one or more smart contract actions, the invocation reflecting a resolution determined by the selected mediator.

In another implementation of the foregoing computer-readable storage medium enforcing the smart contract further comprises: transmitting to the mediator at least a portion of escrowed cryptocurrency held in escrow pursuant to the terms of the smart contract, the transmitting commencing upon invocation by the selected mediator of at least one of the one or more smart contract actions.

In another implementation of the foregoing computer-readable storage medium, the one or more smart contract actions enable the mediator to perform one or more of the following actions: rescind the contract; release some or all the escrowed cryptocurrency to the first party; release some or all of the escrowed cryptocurrency to the second party; or actions agreed upon by the first party and the second party prior to formation of the smart contract.

In another implementation of the foregoing computer-readable storage medium the selected mediator is chosen via a social network including a plurality of mediators.

In another implementation of the foregoing computer-readable storage medium, the method further comprises: capturing communications between at least the first and the second party to identify an engagement between the first party and the second party; identifying the transaction terms from the captured communications, the transaction terms including mediation terms; and causing the smart contract template to be presented to the first party and or the second party based at least in part on the identified transaction terms.

VI. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A method comprising:
  accepting a selection of a smart contract template from a first party or a second party, the first and second party engaging in a transaction and determining the selected smart contract template based at least in part on transaction terms negotiated between the first and second party;
  accepting a selected mediator from the first and second party, the selected mediator being jointly chosen by the first and second party;
  generating a smart contract based at least in part on the selected smart contract template and including smart contract terms based at least in part on the transaction terms, the smart contract terms including designation of the selected mediator for resolution of disputes arising under the smart contract, the smart contract enabling one or more smart contract actions to be invoked by one or more of the first party, the second party and the selected mediator;
  instantiating the smart contract in conjunction with a distributed ledger;
  querying the smart contract on behalf of an identified user comprising one of the first party, the second party or the selected mediator to determine an action that may be performed by the identified user with respect to the smart contract;
  responsive to determining the action that may be performed by the identified user, generating for the identified user a user interface comprising at least one user interface element that includes content specified by a user experience annotation included in the smart contract, the user interface enabling the identified user to perform the determined action via an interaction with the user interface;
  providing the user interface for display to the identified user; and
  performing the determined action responsive to the identified user interacting with the user interface.

2. The method of claim 1, wherein the identified user comprises one of the first party or the second party and wherein the determined action comprises initiating a dispute process, wherein the dispute process enables the selected mediator to invoke one or more of the one or more smart contract actions, the invocation reflecting a resolution determined by the selected mediator.

3. The method of claim 1, wherein the identified user comprises the selected mediator and wherein the determined action comprises:
  transmitting to the selected mediator at least a portion of cryptocurrency held in escrow pursuant to the terms of the smart contract.

4. The method of claim 1, wherein the identified user comprises the selected mediator and the determined action comprises one of: rescind the contract; release some or all the escrowed cryptocurrency to the first party; release some or all of the escrowed cryptocurrency to the second party; or actions agreed upon by the first party and the second party prior to formation of the smart contract.

5. The method of claim 1, wherein the selected mediator is chosen via a social network including a plurality of mediators.

6. The method of claim 1, further comprising:
  capturing communications between at least the first and the second party to identify an engagement between the first party and the second party;
  identifying the transaction terms from the captured communications, the transaction terms including mediation terms; and
  causing the smart contract template to be presented to the first party and/or the second party based at least in part on the identified transaction terms.

7. The method of claim 6 wherein first party and the second party engage via a social network, and the captured communications comprise one or more of: social network based communications, instant messages, text messages or email messages.

8. A smart contract generation system, comprising:
  one or more processors and one or more memory devices connected thereto, the one or more memory devices storing computer program logic for execution by the one or more processors, the computer program logic configured to:
    accept a selection of a smart contract template from a first party or a second party, the first and second party engaging in a transaction and determining the selected smart contract template based at least in part on transaction terms negotiated between the first and second party;
    accept a selected mediator from the first and second party, the selected mediator being jointly chosen by the first and second party;
    generate a smart contract based at least in part on the selected smart contract template and including smart contract terms based at least in part on the transaction terms, the smart contract terms including designation of the selected mediator for resolution of disputes arising under the smart contract, the smart contract enabling one or more smart contract actions to be invoked by one or more of the first party, the second party and the selected mediator;

instantiate the smart contract in conjunction with a distributed ledger;

query the smart contract on behalf of an identified user comprising one of the first party, the second party or the selected mediator to determine an action that may be performed by the identified user with respect to the smart contract;

responsive to determining the action that may be performed by the identified user, generate for the identified user a user interface comprising at least one user interface element that includes content specified by a user experience annotation included in the smart contract, the user interface enabling the identified user to perform the determined action via an interaction with the user interface;

provide the user interface for display to the identified user; and perform the determined action responsive to the identified user interacting with the user interface.

9. The smart contract generation system of claim 8 wherein the identified user comprises one of the first party or the second party and wherein the determined action comprises initiating a dispute process, wherein the dispute process enables the selected mediator to invoke one or more of the one or more smart contract actions, the invocation reflecting a resolution determined by the selected mediator.

10. The smart contract generation system of claim 8 wherein the identified user comprises the selected mediator and wherein the determined action comprises transmit transmitting to the selected mediator at least a portion of escrowed cryptocurrency held in escrow pursuant to the terms of the smart contract.

11. The smart contract generation system of claim 8 wherein the identified user comprises the selected mediator and the determined action comprises one of: rescind the contract; release some or all the escrowed cryptocurrency to the first party; release some or all of the escrowed cryptocurrency to the second party; or actions agreed upon by the first party and the second party prior to formation of the smart contract.

12. The smart contract generation system of claim 8, wherein the selected mediator is chosen via a social network including a plurality of mediators.

13. The computer-readable storage medium of claim 12, wherein the identified user comprises the selected mediator and wherein the determined action comprises:

transmitting to the selected mediator at least a portion of escrowed cryptocurrency held in escrow pursuant to the terms of the smart contract.

14. The smart contract generation system of claim 8 wherein the computer program logic is further configured to:

capture communications between at least the first and the second party to identify an engagement between the first party and the second party;

identify the transaction terms from the captured communications, the transaction terms including mediation terms; and cause the smart contract template to be presented to the first party and/or the second party based at least in part on the identified transaction terms.

15. The smart contract generation system of claim 14 wherein first party and the second party engage via a social network, and the captured communications comprise one or more of: social network based communications, instant messages, text messages or email messages.

16. A computer-readable storage medium having program instructions recorded thereon that, when executed by at least one processor, perform a method, the method comprising:

accepting a selection of a smart contract template from a first party or a second party, the first and second party engaging in a transaction and determining the selected smart contract template based at least in part on transaction terms negotiated between the first and second party;

accepting a selected mediator from the first and second party, the selected mediator being jointly chosen by the first and second party;

generating a smart contract based at least in part on the selected smart contract template and including smart contract terms based at least in part on the transaction terms, the smart contract terms including designation of the selected mediator for resolution of disputes arising under the smart contract, the smart contract enabling one or more smart contract actions to be invoked by one or more of the first party, the second party and the selected mediator;

instantiating the smart contract in conjunction with a distributed ledger;

querying the smart contract on behalf of an identified user comprising one of the first party, the second party or the selected mediator to determine an action that may be performed by the identified user with respect to the smart contract;

responsive to determining the action that may be performed by the identified user, generating for the identified user a user interface comprising at least one user interface element that includes content specified by a user experience annotation included in the smart contract, the user interface enabling the identified user to perform the determined action via an interaction with the user interface;

providing the user interface for display to the identified user; and performing the determined action responsive to the identified user interacting with the user interface.

17. The computer-readable storage medium of claim 16, wherein the identified user comprises one of the first party and or the second party and wherein the determined action comprises to initiate initiating a dispute process, wherein the dispute process enables the selected mediator to invoke one or more of the one or more smart contract actions, the invocation reflecting a resolution determined by the selected mediator.

18. The computer-readable storage medium of claim 16, wherein the identified user comprises the selected mediator and the determined action comprises one of: rescind the contract; release some or all the escrowed cryptocurrency to the first party; release some or all of the escrowed cryptocurrency to the second party; or actions agreed upon by the first party and the second party prior to formation of the smart contract.

19. The computer-readable storage medium of claim 16, wherein the selected mediator is chosen via a social network including a plurality of mediators.

20. The computer-readable storage medium of claim 16, wherein the method further comprises:

capturing communications between at least the first and the second party to identify between the first party and the second party;
identifying the transaction terms from the captured communications, the transaction terms including mediation terms; and
causing the smart contract template to be presented to the first party and or the second party based at least in part on the identified transaction terms.

\* \* \* \* \*